United States Patent
Justice et al.

(12) 
(10) Patent No.: US 9,063,988 B2
(45) Date of Patent: Jun. 23, 2015

(54) DATABASE METHODS AND APPARATUS

(75) Inventors: Christopher Floyd Justice, Castle Rock, CO (US); David Martin Lovejoy, Parker, CO (US); Bryan S. Hinds, Denver, CO (US); Jerry A. Goetsch, Erie, CO (US); William Perry Compton, Longmont, CO (US)

(73) Assignee: The Boeing Company, Chicago, IL (US)

( * ) Notice: Subject to any disclaimer, the term of this patent is extended or adjusted under 35 U.S.C. 154(b) by 1035 days.

(21) Appl. No.: 12/409,096

(22) Filed: Mar. 23, 2009

(65) Prior Publication Data

US 2010/0241670 A1 Sep. 23, 2010

(51) Int. Cl.
G06F 7/00 (2006.01)
G06F 17/00 (2006.01)
G06F 17/30 (2006.01)

(52) U.S. Cl.
CPC .... *G06F 17/30539* (2013.01); *G06F 17/30551* (2013.01)

(58) Field of Classification Search
CPC .............. G06F 17/30572; G06F 17/30392; G06F 17/3056; G06F 17/30539; G06F 17/30551
USPC ....... 707/649, 610; 703/22; 711/170; 345/13; 701/21; 717/101; 715/225
See application file for complete search history.

(56) References Cited

U.S. PATENT DOCUMENTS

| | | | | |
|---|---|---|---|---|
| 6,278,965 | B1 * | 8/2001 | Glass et al. | 703/22 |
| 7,647,466 | B1 * | 1/2010 | Rao et al. | 711/170 |
| 7,657,533 | B2 * | 2/2010 | Gold et al. | 707/999.01 |
| 7,664,798 | B2 * | 2/2010 | Wood et al. | 707/649 |
| 8,078,655 | B2 * | 12/2011 | Grubov et al. | 707/610 |
| 2008/0042923 | A1 * | 2/2008 | De Laet | 345/1.3 |
| 2008/0059942 | A1 * | 3/2008 | Brown et al. | 717/101 |
| 2008/0141206 | A1 * | 6/2008 | He | 716/12 |
| 2009/0048726 | A1 * | 2/2009 | Lofall | 701/21 |
| 2009/0199090 | A1 * | 8/2009 | Poston et al. | 715/255 |

OTHER PUBLICATIONS

Brunk, B. et al.; Aeronautical Information Exchange Model (AIXM) Temporality Model; Nov. 15, 2007; 28 pages; 2007—EUROCONTROL and Federal Aviation Administration; Version 5.0.
Snodgrass, R.; Developing Time-Oriented Database Applications in SQL; 2000; 528 pages; Morgan Kaufmann Publishers; USA.

* cited by examiner

*Primary Examiner* — Susan Chen
(74) *Attorney, Agent, or Firm* — Armstrong Teasdale LLP

(57) ABSTRACT

An apparatus having a computer-implemented database controller module, a computer-implemented database module, and a computer-implemented database query module. Software and/or firmware that is/are included in computer-implemented database controller module is/are configured to enter baseline data into the computer-implemented database module and to enter changes into the computer-implemented database module using an extensible multidimensional effectivity method of recording only an indicated change with its effectivity parameters. The computer-implemented database query module is configured to retrieve answers to queries relating to the baseline data and the changes and to return the answers in response to the queries.

17 Claims, 37 Drawing Sheets

LTA

| Unique ID | Feature ID | Transaction type | Durability | Valid_Start | Valid_End | Trans_start | Trans_end | Tailored_id | Name | Length | Width | Airport_feature_id |
|---|---|---|---|---|---|---|---|---|---|---|---|---|
| 1 | 1 | Baseline | Perm | 1/1/2008 | 12/31/3000 | 1/1/2008 | 12/31/3000 | | KDEN/16R-34L | 2000 | 300 | 1 |
| 2 | 1 | delta | Temp | 1/3/2008 | 1/15/3000 | 1/3/2008 | 12/31/3000 | | | 2500 | | 1 |
| 3 | 1 | delta | Temp | 1/3/2008 | 1/15/3000 | 1/3/2008 | 12/31/3000 | | | | 350 | 1 |
| 4 | 2 | Baseline | Perm | 1/13/2008 | 12/31/3000 | 1/8/2008 | 12/31/3000 | | KDEN/16L-34R | 2500 | 350 | 1 |
| 5 | 2 | Delete | Perm | 1/15/2008 | 12/31/3000 | 1/15/2008 | 12/31/3000 | | | | | 1 |
| 6 | 1 | delta | Perm | 1/5/2008 | 12/31/3000 | 1/5/2008 | 12/31/3000 | GOETSCH | | 2200 | | 1 |
| 7 | 3 | Baseline | Perm | 1/5/2008 | 12/31/3000 | 1/5/2008 | 12/31/3000 | GOETSCH | KDEN/10-28 | 3000 | 400 | 1 |

*FIG. 4*

Airport

| Unique ID | Feature ID | Transaction type | Durability | Valid_Start | Valid_End | Trans_start | Trans_end | Tailored_id | icao | airport_id | elevation | name | Location |
|---|---|---|---|---|---|---|---|---|---|---|---|---|---|
| 1 | 1 | baseline | perm | 1/1/2008 | 12/31/3000 | 1/1/2008 | 12/31/3000 | | KPUB | | 4000 | Pueblo Memorial | 38,-104 |
| 2 | 1 | delta | perm | 1/3/2008 | 12/31/3000 | 1/3/2008 | 12/31/3000 | | | | 4400 | | |
| 3 | 1 | delta | perm | 1/5/2008 | 12/31/3000 | 1/5/2008 | 12/31/3000 | Goetsch | | | 4200 | | |
| 4 | 1 | delta | perm | 1/5/2008 | 12/31/3000 | 1/5/2008 | 12/31/3000 | Goetsch | | | | | 38,-103 |

| Airport | | | | | | | | | | | | | |
|---|---|---|---|---|---|---|---|---|---|---|---|---|---|
| Unique ID | Feature ID | Transaction type | Durability | Valid_Start | Valid_End | Trans_start | Trans_end | Tailored_id | icao | airport_id | elevation | name | Location |
| 1 | 1 | baseline | perm | 1/1/2008 | 12/31/3000 | 1/1/2008 | 12/31/3000 | | KPUB | | 4000 | Pueblo Memorial | 38,-104 |
| 2 | 1 | delta | perm | 1/3/2008 | 12/31/3000 | 1/3/2008 | 12/31/3000 | | | | 4400 | | |
| 3 | 1 | delta | perm | 1/5/2008 | 12/31/3000 | 1/5/2008 | 1/7/3000 | Goetsch | | | 4200 | | |
| 4 | 1 | delta | perm | 1/5/2008 | 12/31/3000 | 1/5/2008 | 12/31/3000 | Goetsch | | | | | 38,-103 |
| 5 | 1 | delta | perm | 1/5/2008 | 1/9/3000 | 1/7/2008 | 12/31/3000 | Goetsch | | | 4200 | | |

| Airport | | | | | | | | | | | | | |
|---|---|---|---|---|---|---|---|---|---|---|---|---|---|
| Unique ID | Feature ID | Transaction type | Durability | Valid_Start | Valid_End | Trans_start | Trans_end | Tailored_id | icao | airport_id | elevation | name | Location |
| 1 | 1 | baseline | perm | 1/1/2008 | 12/31/3000 | 1/1/2008 | 12/31/3000 | | KPUB | | 4000 | Pueblo Memorial | 38,-104 |
| 2 | 1 | delta | perm | 1/3/2008 | 12/31/3000 | 1/3/2008 | 12/31/3000 | | | | 4400 | | |
| 3 | 1 | delta | perm | 1/5/2008 | 12/31/3000 | 1/5/2008 | 1/7/3000 | Goetsch | | | 4200 | | |
| 4 | 1 | delta | perm | 1/5/2008 | 1/9/2008 | 1/5/2008 | 1/9/2008 | Goetsch | | | | | |
| 5 | 1 | delta | perm | 1/5/2008 | 1/9/2008 | 1/7/2008 | 12/31/3000 | Goetsch | | | 4200 | | 38,-103 |
| 6 | 1 | delta | perm | 1/5/2008 | 1/11/2008 | 1/9/2008 | 12/31/3000 | Goetsch | | | | | 38,-103 |

LTA

| Unique ID | Feature ID | Transaction type | Durability | Valid_Start | Valid_End | Trans_start | Trans_end | Tailored_id | Name | Length | Width | Airport_feature_id |
|---|---|---|---|---|---|---|---|---|---|---|---|---|
| 1 | 1 | Baseline | Perm | 1/1/2008 | 12/31/3000 | 1/1/2008 | 12/31/3000 | | KAPA/17R-35L | 1000 | 150 | 1 |
| 2 | 1 | Delta | Perm | 1/2/2008 | 12/31/3000 | 1/2/2008 | 12/31/3000 | | | | 100 | 1 |

LTA

| Unique ID | Feature ID | Transaction type | Durability | Valid_Start | Valid_End | Trans_start | Trans_end | Tailored_id | Name | Length | Width | Airport_feature_id |
|---|---|---|---|---|---|---|---|---|---|---|---|---|
| 1 | 1 | Baseline | Perm | 1/1/2008 | 12/31/3000 | 1/1/2008 | 12/31/3000 | | KAPA/17R-35L | 10000 | 150 | 1 |
| 2 | 1 | Delta | Perm | 1/2/2008 | 12/31/3000 | 1/2/2008 | 1/31/2008 | | | | 100 | 1 |
| 3 | 1 | Delta | Perm | 1/2/2008 | 12/31/3000 | 1/3/2008 | 12/31/3000 | | | | 110 | 1 |

1002

LTA

| Unique ID | Feature ID | Transaction type | Durability | Valid_Start | Valid_End | Trans_start | Trans_end | Tailored_id | Name | Length | Width | Airport_feature_id |
|---|---|---|---|---|---|---|---|---|---|---|---|---|
| 1 | 1 | Baseline | Perm | 1/1/2008 | 12/31/3000 | 1/1/2008 | 12/31/3000 | | KAPA/17R-35L | 10000 | 150 | 1 |
| 2 | 1 | Delta | Perm | 1/2/2008 | 12/31/3000 | 1/2/2008 | 1/3/2008 | | | | 100 | 1 |
| 3 | 1 | Delta | Perm | 1/2/2008 | 12/31/3000 | 1/3/2008 | 12/31/3000 | | | | 110 | 1 |
| 4 | 1 | Delta | Perm | 1/5/2008 | 12/31/3000 | 1/5/2008 | 1/6/2008 | | | 9000 | | 1 |

LTA

| Unique ID | Feature ID | Transaction type | Durability | Valid_Start | Valid_End | Trans_start | Trans_end | Tailored_id | Name | Length | Width | Airport_feature_id |
|---|---|---|---|---|---|---|---|---|---|---|---|---|
| 1 | 1 | Baseline | Perm | 1/1/2008 | 12/31/3000 | 1/1/2008 | 12/31/3000 | | KAPA/17R-35L | 10000 | 150 | 1 |
| 2 | 1 | Delta | Perm | 1/2/2008 | 12/31/3000 | 1/2/2008 | 1/3/2008 | | | | 100 | 1 |
| 3 | 1 | Delta | Perm | 1/2/2008 | 12/31/3000 | 1/3/2008 | 12/31/3000 | | | | 110 | 1 |
| 4 | 1 | Delta | Perm | 1/5/2008 | 12/31/3000 | 1/5/2008 | 1/6/2008 | | | 9000 | | 1 |
| 5 | 1 | Delta | Perm | 1/6/2008 | 12/31/3000 | 1/6/2008 | 12/31/3000 | | | 9000 | | 1 |

| Unique ID | Feature ID | Transaction type | Durability | Valid_Start | Valid_End | Trans_start | Trans_end | Tailored_id | Name | Length | Width | Airport_feature_id |
|---|---|---|---|---|---|---|---|---|---|---|---|---|
| 1 | 1 | Baseline | Perm | 1/1/2008 | 12/31/3000 | 1/1/2008 | 12/31/3000 | | KAPA/17R-35L | 10000 | 150 | 1 |
| 2 | 1 | Delta | Perm | 1/2/2008 | 12/31/3000 | 1/2/2008 | 1/3/2008 | | | | 100 | 1 |
| 3 | 1 | Delta | Perm | 1/2/2008 | 12/31/3000 | 1/3/2008 | 12/31/3000 | | | | 110 | 1 |
| 4 | 1 | Delta | Perm | 1/5/2008 | 12/31/3000 | 1/5/2008 | 1/6/2008 | | | 9000 | | 1 |
| 5 | 1 | Delta | Perm | 1/6/2008 | 12/31/3000 | 1/6/2008 | 1/6/2008 | | | 9000 | | 1 |
| 6 | 1 | Delta | Perm | 1/6/2008 | 1/16/2008 | 1/6/2008 | 12/31/3000 | | | 9000 | | 1 |

LTA

| | | Navaid | | | | | | |
|---|---|---|---|---|---|---|---|---|
| Unique ID | Feature ID | Transaction type | Durability | Valid_Start | Valid_End | Trans_start | Trans_end | Tailored_id | Navaid ID | elevation | name |
| 1 | 1 | Baseline | perm | 1/1/2008 | 12/31/3000 | 1/1/2008 | 12/31/3000 | | KCAS | 6000 | Douglas County |
| 2 | 1 | delta | perm | 1/3/2008 | 12/31/3000 | 1/3/2008 | 12/31/3000 | | | 6100 | |
| 3 | 1 | delta | perm | 1/5/2008 | 12/31/3000 | 1/5/2008 | 12/31/3000 | | | | DC |

| Unique ID | Feature ID | Transaction type | Durability | Valid_Start | Valid_End | Trans_start | Trans_end | Tailored_id | Navaid ID | elevation | name |
|---|---|---|---|---|---|---|---|---|---|---|---|
| 1 | 1 | Baseline | perm | 1/1/2008 | 12/31/3000 | 1/1/2008 | 12/31/3000 | | KCAS | 6000 | Douglas County |
| 2 | 1 | delta | perm | 1/3/2008 | 12/31/3000 | 1/3/2008 | 1/7/2008 | | | 6100 | |
| 3 | 1 | delta | perm | 1/5/2008 | 12/31/3000 | 1/5/2008 | 12/31/3000 | | | | DC |
| 4 | 1 | delta | perm | 1/9/2008 | 12/31/3000 | 1/7/2008 | 12/31/3000 | | | 6100 | |

1602

| Airport | | | | | | | | | | |
|---|---|---|---|---|---|---|---|---|---|---|
| Unique ID | Feature ID | Transaction type | Durability | Valid_Start | Valid_End | Trans_start | Trans_end | Tailored_id | icao_airport_id | elevation | name | Location |
| 1 | 1 | baseline | perm | 1/1/2008 | 12/31/3000 | 1/1/2008 | 1/3/2008 | | KPUB | 4000 | Pueblo Memorial | 38,-104 |
| 2 | 1 | baseline | perm | 1/3/2008 | 12/31/3000 | 1/3/2008 | 12/31/3000 | | KPUB | 4000 | Pueblo Memorial | 38,-104 |
| 3 | 1 | delta | perm | 1/5/2008 | 1/11/2008 | 1/5/2008 | 12/31/3000 | | | 5500 | | |
| 4 | 1 | delta | Temp | 1/7/2008 | 12/31/3000 | 1/7/2008 | 12/31/3000 | | | 6000 | | |
| 5 | 1 | delta | Temp | 1/7/2008 | 12/31/3000 | 1/7/2008 | 12/31/3000 | | | | Lovejoy Intl | |

FIG. 19

Airport

| Unique ID | Feature ID | Transaction type | Durability | Valid_Start | Valid_End | Trans_start | Trans_end | Tailored_id | icao | airport_id | elevation | name | Location |
|---|---|---|---|---|---|---|---|---|---|---|---|---|---|
| 1 | 1 | baseline | perm | 1/1/2008 | 12/31/3000 | 1/1/2008 | 1/3/2008 | | KPUB | | 4000 | Pueblo Memorial | 38,-104 |
| 2 | 1 | delta | perm | 1/5/2008 | 1/11/2008 | 1/5/2008 | 12/31/3000 | | | | 5500 | | |
| 3 | 1 | delta | Temp | 1/7/2008 | 12/31/3000 | 1/7/2008 | 12/31/3000 | | | | 6000 | | |
| 4 | 1 | delta | Temp | 1/7/2008 | 12/31/3000 | 1/7/2008 | 12/31/3000 | | | | | Lovejoy Intl | |
| 5 | 1 | baseline | Perm | 1/3/2008 | 12/31/3000 | 1/3/2008 | 12/31/3000 | | KPUB | | 4000 | Pueblo Memorial | 38,-104 |
| 6 | 1 | delta | perm | 1/9/2008 | 12/31/3000 | 1/9/2008 | 12/31/3000 | | | | | | 38,-103 |
| 7 | 1 | delete | perm | 1/13/2008 | 12/31/3000 | 1/11/2008 | 12/31/3000 | | | | | | |

FIG. 21

Airport

| Unique ID | Feature ID | Transaction type | Durability | Valid_Start | Valid_End | Trans_start | Trans_end | Tailored_id | icao | airport_id | elevation | name | Location |
|---|---|---|---|---|---|---|---|---|---|---|---|---|---|
| 1 | 1 | baseline | perm | 1/1/2008 | 12/31/3000 | 1/1/2008 | 1/3/2008 | | KPUB | | 4000 | Pueblo Memorial | 38,-104 |
| 2 | 1 | delta | perm | 1/5/2008 | 1/11/2008 | 1/5/2008 | 12/31/3000 | | | | 5500 | | |
| 3 | 1 | delta | Temp | 1/7/2008 | 12/31/3000 | 1/7/2008 | 12/31/3000 | | | | 6000 | | |
| 4 | 1 | delta | Temp | 1/7/2008 | 12/31/3000 | 1/7/2008 | 12/31/3000 | | | | | Lovejoy Intl | |
| 5 | 1 | baseline | Perm | 1/3/2008 | 12/31/3000 | 1/3/2008 | 12/31/3000 | | KPUB | | 4000 | Pueblo Memorial | 38,-104 |
| 6 | 1 | delta | perm | 1/9/2008 | 12/31/3000 | 1/9/2008 | 12/31/3000 | | | | | | 38,-103 |
| 7 | 1 | delete | perm | 1/13/2008 | 12/31/3000 | 1/11/2008 | 12/31/3000 | | | | | | |
| 8 | 1 | undelete | perm | 1/15/2008 | 12/31/3000 | 1/15/2008 | 12/31/3000 | | | | | | |

FIG. 22

| Unique ID | Feature ID | Transaction type | Durability | Valid_Start | Valid_End | Trans_start | Trans_end | Tailored_id | icao_airport_id | elevation | name | Location |
|---|---|---|---|---|---|---|---|---|---|---|---|---|
| 1 | 1 | baseline | perm | 1/1/2008 | 12/31/3000 | 1/1/2008 | 1/3/2008 | | KPUB | 4000 | Pueblo Memorial | 38,-104 |
| 2 | 1 | delta | perm | 1/5/2008 | 1/11/2008 | 1/5/2008 | 12/31/3000 | | | 5500 | | |
| 3 | 1 | delta | Temp | 1/7/2008 | 12/31/3000 | 1/7/2008 | 12/31/3000 | | | 6000 | | |
| 4 | 1 | delta | Temp | 1/7/2008 | 12/31/3000 | 1/7/2008 | 12/31/3000 | | | | Lovejoy Intl | |
| 5 | 1 | baseline | Perm | 1/3/2008 | 12/31/3000 | 1/3/2008 | 12/31/3000 | | KPUB | 4000 | Pueblo Memorial | 38,-104 |
| 6 | 1 | delta | perm | 1/9/2008 | 12/31/3000 | 1/9/2008 | 12/31/3000 | | | | | 38,-103 |
| 7 | 1 | delete | perm | 1/11/2008 | 12/31/3000 | 1/11/2008 | 12/31/3000 | | | | | |
| 8 | 1 | undelete | perm | 1/15/2008 | 12/31/3000 | 1/15/2008 | 12/31/3000 | | | | | |
| 9 | 1 | delete | perm | 1/17/2008 | 12/31/3000 | 1/17/2008 | 12/31/3000 | Puddle Jumpers | | | | |

Airport

FIG. 23

Airport

| Unique ID | Feature ID | Transaction type | Durability | Valid_Start | Valid_End | Trans_start | Trans_end | Tailored_id | icao | airport_id | elevation | name | Location |
|---|---|---|---|---|---|---|---|---|---|---|---|---|---|
| 1 | 1 | baseline | perm | 1/1/2008 | 12/31/3000 | 1/1/2008 | 1/3/2008 | | KPUB | | 4000 | Pueblo Memorial | 38,-104 |
| 2 | 1 | delta | perm | 1/5/2008 | 1/11/2008 | 1/5/2008 | 12/31/3000 | | | | 5500 | | |
| 3 | 1 | delta | Temp | 1/7/2008 | 12/31/3000 | 1/7/2008 | 12/31/3000 | | | | 6000 | Lovejoy Intl | |
| 4 | 1 | delta | Temp | 1/7/2008 | 12/31/3000 | 1/7/2008 | 12/31/3000 | | | | | | |
| 5 | 1 | baseline | Perm | 1/3/2008 | 12/31/3000 | 1/3/2008 | 12/31/3000 | | KPUB | | 4000 | Pueblo Memorial | 38,-104 |
| 6 | 1 | delta | perm | 1/9/2008 | 12/31/3000 | 1/9/2008 | 12/31/3000 | | | | | | 38,-103 |
| 7 | 1 | delete | perm | 1/13/2008 | 12/31/3000 | 1/11/2008 | 12/31/3000 | | | | | | |
| 8 | 1 | undelete | perm | 1/15/2008 | 12/31/3000 | 1/15/2008 | 12/31/3000 | | | | | | |
| 9 | 1 | delete | perm | 1/17/2008 | 12/31/3000 | 1/17/2008 | 12/31/3000 | Puddle Jumpers | | | | | |
| 10 | 1 | undelete | perm | 1/19/2008 | 12/31/3000 | 1/19/2008 | 12/31/3000 | Puddle Jumpers | | | | | |

FIG. 24

| NAVAID | | | | | | | | | | | |
|---|---|---|---|---|---|---|---|---|---|---|---|
| P1 Create | —2302— Create Navaid | | Navaid_ID=KCAS NAME=Douglas county ELEVATION=6000 | | | | | VS=1 VE=~ TS=1 TE=~ | | | |
| P2 Clear Attr | | —2304— | Change NavAid | Elevation is cleared Where Navaid_ID=KCAS | | | | VS=3 VE=~ TS=3 TE=~ | | | |
| P3 add attribute back after clear | | | —2306— | Change NavAid | Elevation=5500 | | | VS=5 VE=~ TS=5 TE=~ | | | |
| | Jan 1 | Jan 3 | Jan 5 | Jan 7 | Jan 9 | Jan 11 | Jan 13 | Jan 15 | Jan 17 | Jan 19 | Jan 21 |

FIG. 25

Navaid

| Unique ID | Feature ID | Transaction type | Durability | Valid_Start | Valid_End | Trans_start | Trans_end | Tailored_id | Navaid ID | elevation | name |
|---|---|---|---|---|---|---|---|---|---|---|---|
| 1 | 1 | baseline | perm | 1/1/2008 | 12/31/3000 | 1/1/2008 | 12/31/3000 | | KCAS | 6000 | Douglas County |
| 2 | 1 | Delta | perm | 1/3/2008 | 12/31/3000 | 1/3/2008 | 12/31/3000 | | | <CLEAR> | |

FIG. 26

Navaid

| Unique ID | Feature ID | Transaction type (baseline, delta) | Durability (temp, perm) | Valid_Start | Valid_End | Trans_start | Trans_end | Tailored_id | Navaid ID | elevation | name |
|---|---|---|---|---|---|---|---|---|---|---|---|
| 1 | 1 | baseline | perm | 1/1/2008 | 12/31/3000 | 1/1/2008 | 12/31/3000 | | KCAS | 6000 | Douglas County |
| 2 | 1 | Delta | perm | 1/3/2008 | 12/31/3000 | 1/3/2008 | 12/31/3000 | | | <CLEAR> | |
| 3 | 1 | Delta | perm | 1/5/2008 | 12/31/3000 | 1/5/2008 | 12/31/3000 | | | 5500 | |

| Navaid | | | | | | | | | |
|---|---|---|---|---|---|---|---|---|---|
| Unique_ID | Feature ID | Transaction type | Durability | Valid_Start | Valid_End | Trans_start | Trans_end | Tailored_id | Navaid ID | elevation | name | Frequency |
| 1 | 1 | baseline | perm | 1/1/2008 | 12/31/3000 | 1/1/2008 | 12/31/3000 | | KCAS | 6000 | Douglas County | |
| 2 | 1 | Delta | perm | 1/3/2008 | 12/31/3000 | 1/3/2008 | 12/31/3000 | | | <CLEAR> | | |
| 3 | 1 | Delta | perm | 1/5/2008 | 12/31/3000 | 1/5/2008 | 12/31/3000 | | | 5500 | | |
| 4 | 1 | Delta | perm | 1/7/2008 | 12/31/3000 | 1/3/2008 | 12/31/3000 | | | | | 133.6 |

FIG. 30

| Navaid | | | | | | | | | |
|---|---|---|---|---|---|---|---|---|---|
| Unique_ID | Feature ID | Transaction type | Durability | Valid_Start | Valid_End | Trans_start | Trans_end | Tailored_id | Navaid ID | elevation | name | Frequency |
| 1 | 1 | baseline | perm | 1/1/2008 | 12/31/3000 | 1/1/2008 | 12/31/3000 | | KCAS | 6000 | Douglas County | |
| 2 | 1 | Delta | perm | 1/3/2008 | 12/31/3000 | 1/3/2008 | 12/31/3000 | | | <CLEAR> | | |
| 3 | 1 | Delta | perm | 1/5/2008 | 12/31/3000 | 1/5/2008 | 12/31/3000 | | | 5500 | | |
| 4 | 1 | Delta | perm | 1/7/2008 | 12/31/3000 | 1/3/2008 | 12/31/3000 | | | | | 133.6 |
| 5 | 1 | Delta | perm | 1/5/2008 | 12/31/3000 | 1/5/2008 | 12/31/3000 | | | | | 120.6 |

| Feature relationships/Associations Many to Many | | | | | |
|---|---|---|---|---|---|
| P1 Add | —3602— Create Airport | KCOS, name = colorado springs, elevation = 6100 | | | VS=1, VE=~ TS=1, TE=~ |
| P2 Add | —3604— Create Airport | KLIM name = Limon International Elevation = 5200 | | | VS=1, VE=~ TS=1, TE=~ |
| P3 Change | —3606— Change Airport | Elevation = 6050 Where ICAO=KCOS | | | VS=3, VE=~ TS=3, TE=~ |
| P4 Add | —3608— | Navaid ID=KDEL NAME=Limon VOR ELEVATION=6000 Serves KLIM and KCOS | | | VS=3, VE=~ TS=3, TE=~ |
| P5 Correction | —3610— | Serves KLIM and KCOS | Navaid ID=KDEL NAME=Limon VOR ELEVATION=6000 | | VS=5, VE=~ TS=3, TE=~ |
| P6 Add | —3612— | | Navaid ID=KPIG NAME=Piggy VOR ELEVATION=6120 Serves KCOS | | VS=7, VE=~ TS=7, TE=~ |
| P7 Serves Change | —3614— | | Navaid ID=KPIG Serves KLIM | | VS=9, VE=~ TS=9, TE=~ |
| P8 Tailoring | —3616— | | Navaid ID=KDEL for Goetsch Serves KCOS | | VS=7, VE=~ TS=7, TE=~ |
| P9 Delete | —3618— | | | Delete Navaid ID=KPIG | VS=11, VE=~ TS=11, TE=~ |
| P10 Undelete | 3620 | | | Undelete Navaid ID=KPIG | VS=13, VE=~ TS=13, TE=~ |
| P11 Delete | 3622 | | | Delete Airport KCOS | VS=13, VE=~ TS=13, TE=~ |
| | Jan 1  Jan 3 | Jan 5  Jan 7 | Jan 9  Jan 11 | Jan 13  Jan 15 | |

FIG. 38

Airport — 3700

| Unique ID | Feature ID | Transaction type | Durability | Valid_Start | Valid_End | Trans_start | Trans_end | Tailored_id | icao | airport_id | elevation | name | Location |
|---|---|---|---|---|---|---|---|---|---|---|---|---|---|
| 1 | 1 | Baseline | Perm | 1/1/2008 | 12/31/3000 | 1/1/2008 | 12/31/3000 | | KCOS | | 6100 | colorado springs | |
| 2 | 2 | Baseline | Perm | 1/1/2008 | 12/31/3000 | 1/1/2008 | 12/31/3000 | | KLIM | | 5200 | Limon Intl | |
| 3 | 3 | Baseline | Perm | 1/1/2008 | 12/31/3000 | 1/1/2008 | 12/31/3000 | | KPUB | | 4400 | Pueblo Memorial | |
| 4 | 1 | Delta | Perm | 1/3/2008 | 12/31/3000 | 1/3/2008 | 12/31/3000 | | | | 6050 | | |
| 5 | 1 | Delete | Perm | 1/13/2008 | 12/31/3000 | 1/13/2008 | 12/31/3000 | | | | | | |

Navaid — 3800

| Unique ID | Feature ID | Transaction type | Durability | Valid_Start | Valid_End | Trans_start | Trans_end | Tailored_id | Navaid ID | elevation | name | Frequency |
|---|---|---|---|---|---|---|---|---|---|---|---|---|
| 1 | 6 | Baseline | Perm | 1/3/2008 | 12/31/3000 | 1/3/2008 | 1/3/2008 | | KDEL | 6000 | Limon VOR | |
| 2 | 6 | Baseline | Perm | 1/5/2008 | 12/31/3000 | 1/3/2008 | 12/31/3000 | | KDEL | 6000 | Limon VOR | |
| 3 | 7 | Baseline | Perm | 1/7/2008 | 12/31/3000 | 1/7/2008 | 12/31/3000 | | KPIG | 6120 | Piggy VOR | |
| 8 | 6 | Delta | Perm | 1/7/2008 | 1/31/2008 | 1/7/2008 | 12/31/3000 | Goetsch | | | | |
| 4 | 7 | Delta | Perm | 1/9/2008 | 12/31/3000 | 1/9/2008 | 12/31/3000 | | | | | |
| 5 | 7 | Delete | Perm | 1/11/2008 | 12/31/3000 | 1/11/2008 | 12/31/3000 | | | | | |
| 6 | 7 | Undelete | Perm | 1/13/2008 | 12/31/3000 | 1/13/2008 | 12/31/3000 | | | | | |
| 7 | 6 | Delta | Perm | 1/13/2008 | 12/31/3000 | 1/13/2008 | 12/31/3000 | | | | | |

| Airport | | | | | | | | | | |
|---|---|---|---|---|---|---|---|---|---|---|
| Unique_ID | Feature_ID | Transaction type | Durability | Valid_Start | Valid_End | Trans_start | Trans_end | Tailored_id | icao_airport_id | elevation | name | Delete flag |
| 1 | 1 | Baseline | Perm | 1/1/2008 | 12/31/3000 | 12/1/2007 | 12/31/3000 | | KDEN | 5000 | Joe | |
| 2 | 1 | delta | Perm | 1/5/2008 | 12/31/3000 | 12/5/2007 | 12/31/3000 | | | 5200 | | |
| 3 | 1 | delta | Perm | 1/5/2008 | 1/11/2008 | 12/5/2007 | 12/31/3000 | | | | Frank | |
| 4 | 1 | delta | Perm | 1/13/2008 | 12/31/3000 | 12/13/2007 | 12/31/3000 | | | | Bob | |
| 5 | 1 | delta | Perm | 1/13/2008 | 12/31/3000 | 12/13/2007 | 12/31/3000 | | | 4500 | | |

DATABASE METHODS AND APPARATUS

BACKGROUND

The field of the disclosure relates generally to databases and more particularly to methods and apparatus for maintaining databases with a plurality of varying applicability of data for features.

In the aeronautical world, most changes that occur to navigation assets are planned and communicated well in advance of when the change actually occurs. Therefore, much of the source information processed by navigation information repositories is predictive in nature in that it describes real-world features as they are expected to exist at some specified point in the future. Navigational information repositories receive this information from a variety of sources and in a variety of formats. Generally, navigational information includes various attributes that designate the availability and applicability of the information for use in aviation products. One of those attributes includes a designator for a period of time for which the information is available (or valid) for use.

Internally, before a customer can receive navigational data products, a significant amount of work is required to analyze and process the navigational information, create assets and products from it, and deliver these products to end-users. All of this effort must be accomplished as efficiently as possible, and with careful reference to the time availability of the data, whether it is in the past, present or future. In addition, it would be useful to maintain the navigational information in such a way as to provide responses tailored to different database users (i.e., customers). Such database maintenance methods and apparatus should provide the ability to associate certain attributes with multiple effectivity dimensions in order to identify and determine the applicability of the data stored in the database for various uses. Effectivity dimensions may be either continuously valued or discrete. While the embodiments described herein are described using effectivity dimensions relevant to navigational data, other continuous effectivity dimensions include, but are not limited to ocean depth in a marine biology context, engine temperature in an automotive design context, geologic era in a paleontology context, and atmospheric pressure in an aerospace context. Further, discrete effectivity dimensions include, but are not limited to material type in an automotive design context, and cause of system failure in an aerospace context.

BRIEF DESCRIPTION

Some configurations of the present disclosure provide an apparatus that includes a computer-implemented database controller module, a computer-implemented database module, and a computer-implemented database query module. Software and/or firmware that is/are included in computer-implemented database controller module is/are configured to enter baseline data into the computer-implemented database module and to enter changes into the computer-implemented database module using an extensible multidimensional effectivity method of recording only an indicated change with its effectivity parameters. The computer-implemented database query module is configured to retrieve answers to queries relating to the baseline data and the changes and to return the answers in response to the queries.

In another aspect, some configurations of the present disclosure provide a method for utilizing a computer-implemented database controller module and a computer-implemented database module. The method includes entering baseline data into the computer-implemented database module using the computer-implemented database controller module. The method further includes using the computer-implemented database controller module to enter changes into the computer-implemented database module, wherein at least one or more changes to the computer-implemented database module are made by the computer-implemented database controller module using an extensible multidimensional effectivity method of recording only an indicated change with its effectivity parameters.

BRIEF DESCRIPTION OF THE DRAWINGS

FIG. 4 shows a baseline-delta database module implementation of the tailored scenario of FIG. 3.

FIG. 6 illustrates a baseline-delta database module implementation of the untailoring scenario of FIG. 5 through transaction P3.

FIG. 7 illustrates a baseline-delta database module implementation of the untailoring scenario of FIG. 5 through transaction P4.

FIG. 8 illustrates a baseline-delta database module implementation of the untailoring scenario of FIG. 5 through transaction P5.

FIG. 10 illustrates a baseline-delta database module implementation of the correction scenario of FIG. 9 up to transaction P2.

FIG. 11 illustrates a baseline-delta database module implementation of the correction scenario of FIG. 9 up to an LTA attribute correction.

FIG. 12 illustrates a baseline-delta database module implementation of the correction scenario of FIG. 9 up to transaction P4.

FIG. 13 illustrates a baseline-delta database module implementation of the correction scenario of FIG. 9 up to the valid start date correction.

FIG. 14 illustrates a baseline-delta database module implementation of the correction scenario of FIG. 9 up to the valid end date correction.

FIG. 16 illustrates a baseline-delta database module implementation of the complex correction scenario of FIG. 15 for transactions P1, P2, and P3.

FIG. 17 illustrates the correction occurring for the baseline-delta database module implementation of the complex correction scenario of FIG. 15 for transactions P1, P2, P3, and P4.

FIG. 19 illustrates a baseline-delta database module implementation of the durability scenario of FIG. 18.

FIG. 21 illustrates a baseline-delta database module implementation of a delete feature transaction of FIG. 20.

FIG. 22 illustrates a baseline-delta database module implementation of an undelete feature transaction of FIG. 20.

FIG. 23 illustrates a baseline-delta database module implementation of a tailored delete feature transaction of FIG. 20.

FIG. 24 illustrates a baseline-delta database module implementation of a tailored undelete feature transaction of FIG. 20.

FIG. 25 illustrates an example attribute clearing scenario.

FIG. 26 illustrates a baseline-delta database module implementation of clearing attributes in the scenario of FIG. 25.

FIG. 27 illustrates a baseline-delta database module implementation of resetting attributes in the scenario of FIG. 25.

FIG. 29 illustrates a baseline-delta database module implementation of the overlapping changes scenario of FIG. 28 up to transaction P4.

FIG. 30 illustrates a baseline-delta database module implementation of the overlapping changes scenario of FIG. 28 up to transaction P5.

FIG. 38 illustrates an example many-to-many relationship scenario.

FIG. 39 illustrates a baseline-delta database module implementation of the example scenario of FIG. 38 for airport objects.

FIG. 40 illustrates a baseline-delta database module implementation of the example scenario of FIG. 38 for NavAid features.

FIG. 43 is an illustration of a baseline-delta database module implementation of the extract scenario of FIG. 42.

DETAILED DESCRIPTION

Figure 1:
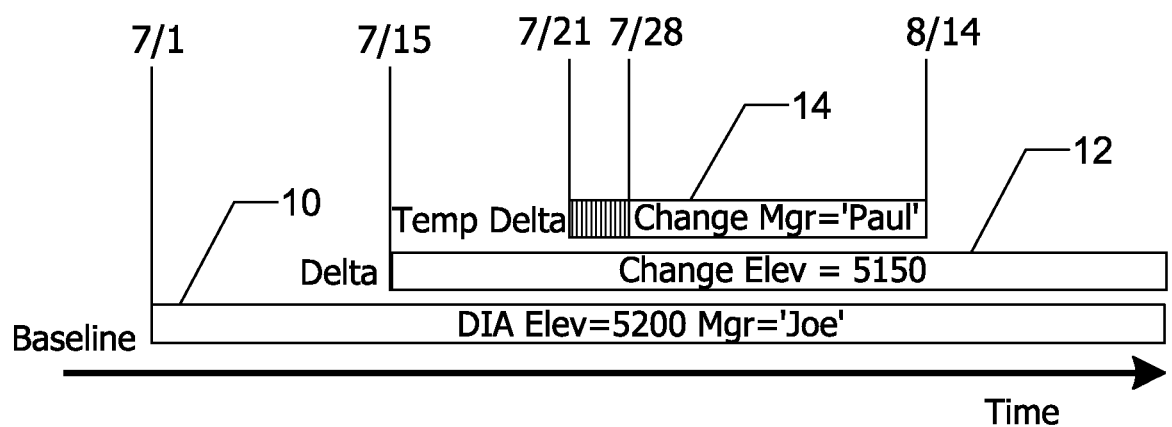
FIG. 1 is a chart illustrating a baseline delta feature change.

In some configurations of the present disclosure, a fully functional multidimensional effectivity model enables a precise representation of time-varying aeronautical feature information indicated by source, the ability to manage changes to data for a specific customer (tailored data), and to maintain permanent and temporary changes to data. Technical effects include storing, maintaining and extracting data that can be represented differently depending on the dimensions specified. For instance, if a runway length is specified at 4000 feet and is considered standard (i.e., non-tailored) data, configurations that contain this runway will include this information. Standard data (in contrast to tailored data) includes data that is made available by official authorities such as the national aviation agencies and/or the hydrographic institutes. These data are usually available for unlimited public usage.

When a specific airline customer says it wants the runway length represented to them as 3990 feet, this information must be provided to the airline customer. This "tailored data" is an example of an effectivity dimension. "Tailored data" is data which have been modified at the request of a customer. This data is only available for the customer requesting the change or others authorized by the customer to access the tailored data. "Standard tailoring" is customization of data that is otherwise available in untailored form. "Pure tailoring" is creation of data solely for the tailored purpose. An example of standard tailored data is a request by an airline to modify a modeled length of a runway. For example, assume that effective Feb. 1, 2007, Polar Airlines has specified the length of a certain runway as 4800. The remaining attributes of the feature (i.e., the runway) are specified to be the same as the standard data for the runway. If a query were to be made for the specified runway effective on Feb. 5, 2007 for Polar Airlines, the length would be returned as 4800. If the same query were to be made for the Standard version of the runway, the length would return as 5000. An example of pure tailored data is the creation of a waypoint for use by a particular airline. This waypoint would not use any standard data, and a query for standard data waypoints would not return the waypoint. The tailoring of data for customers introduces another effectivity dimension of the data, as versions of the data for standard use must be kept as well as separate versions for each customer who has requested a tailored version. Tailored data may also change over time, thus in some configurations changes are allowed to occur independently on the temporal dimension and the tailoring dimension. Configurations of extensible multidimensional effectivity methods in the present disclosure will easily accommodate additional effectivity dimensions such as Tailored Data.

Some configurations of the present disclosure utilize an extensible multidimensional effectivity method in which delta transactions are recorded in the database using a temporal effectivity dimension with other effectivity dimensions such as tailoring and/or durability. In known bi-temporal effectivity models, the effectivity information indicates a "valid time" and "transaction time" of a recorded fact. Other models utilize what is referred to as a versioned feature approach, where the storage of temporal features is accomplished by storing versioned time slices of the feature. Each time slice represents a snapshot of the feature from a given start point until a given endpoint. When the time slices are chained together, a complete picture of the feature as it changes throughout time can be reconstructed.

By contrast, in a multidimensional effectivity configuration, effectivity information (possibly including temporal information) indicates a point or range in any or several dimensions in which the recorded fact is in effect. Additionally, when another effectivity dimension is required to manage data, the database configuration accommodates the additional effectivity dimension. This effectivity model is valid for both features and attributes.

Changes may also occur independently in each of the defined dimensions. Thus, a transactional (or change-based) database method that is referred to as a baseline-delta method is used in some configurations. In a baseline-delta configuration, a "baseline" representation of a modeled feature is stored as well as a series of independent changes (deltas) that are recorded against the baseline. Each of these deltas is individually tagged with appropriate effectivity dimension information.

In some configurations, multidimensional effectivity inputs (i.e., selection criteria), like temporal, tailoring or durability, are used to ensure that the feature with the attributes that meet the various effectivity criteria (i.e., the dimensions of effectivity) is extracted. A results set for the extracted feature includes a baseline data record of the feature and all delta records that meet the effectivity dimensions specified for the period of time or range of time. All these records combine to represent the feature as the selection criteria dictates.

Some configurations of the present disclosure utilize both an extensible multidimensional effectivity method and a baseline-delta method to maintain a database.

In some configurations of the present disclosure, a provider of database data and a maintainer of data base data, sometimes referred to herein as database provider and/or maintainer (and used herein essentially interchangeably) receives navigational data from a source from which entities represented in the database, their attributes, or changes to the entities or attributes are deemed permanent or temporary in nature. The data received is called "temporary data" if it is published with an expected or known temporary state or condition. However, the expiration date and time of temporary data is not always specified. Temporary data without an expiration date or time may be specified as effective until further notice. "NOTAM" (Notice To Airmen) data, published by the FAA and other aviation authorities, is one such example that may be published as temporary data. An example of NOTAM data is a runway closure due to damage that is effective until further notice. Even so-called "Permanent Data," does not imply that its expiration date and time is always until further notice. Permanent data can have a given expiration date. The concept of Temporary Data versus Permanent Data is known as "durability." The durability of source data is determined by either the source provider or the database provider.

Durability is important when extracting data for asset and product creation. Some products are not intended for use with temporary data, while others may be. Because durability cannot be derived from the temporal aspects of the data, in some embodiments of the present disclosure, the durability of the data is identified, and permanent data are kept separately from temporary data, thereby adding another axis to the effectivity model.

Sometimes, a database provider may make changes, corrections or define specific extensions to source-provided data in support of a particular product or product line. Because this type of change applies for a particular product or product line, the change must be appropriately identified to indicate its intended product usage. Therefore, in some embodiments of the present disclosure, another effectivity dimension is introduced to represent product specific extensions.

Each data dimension represents a fixed condition under which changes to the data may occur. The dimensions are related in that, to retrieve a single representation of a represented database entry for a given product, the usage of these dimensions by the product is taken into account. In some configurations of the present disclosure, the product specifies a fixed position or range on each axis for each dimension. For example, a charting product can specify bitemporal effectivity dates, a tailoring if desired, feature extensions that may be needed by a chart to be produced, and the durability of the data to extract a single representation for each feature needed. The added dimensions increase complexity and can make storing of a single state of a feature contradictory to the needs of multiple products.

A simple example scenario is used herein to illustrate the features and methods used by some configurations of the present disclosure. Not all configurations need necessarily incorporate all of these features and methods to be inventive and useful. In this example scenario:

1. On 7/1 an airport named DIA is created with an elevation of 5200, and a manager named 'Joe'. The airport is signified by source as having permanent durability, with duration of 'Until Further Notice'. (It is not necessary to specify a year for purposes of this example scenario, so dates are given as month/day.)

2. On 7/15 the airport's elevation is updated to 5150 (a permanent change with immediate effect and until further notice).

3. On 7/21 the airport's manager is changed (temporarily) to 'Paul' with a future effective date of 7/28, expiring on 8/14, thereby having a temporary durability.

In some configurations of the present disclosure and referring to FIG. 1, a Baseline-Delta method is used to store features and feature changes. In this method a baseline record 10 storing a complete snapshot of the feature at the feature's start of life is stored in a database. Throughout time, deltas (changes to features) such as delta 12 and delta 14 are stored as they occur with their own independent multidimensional effectivity parameters. Deltas that occur at a particular time can also be recorded as permanent deltas 12 or temporary deltas 14 in nature. A composite view of the feature need not and, in this configuration, is not explicitly represented in the database. Rather, deltas 12 and 14 are recorded as transactions that can be selectively applied to the baseline representation 10 to derive the desired composite view. At query (extract) time, the baseline representation 10 is combined with all applicable deltas 12, 14 (given the effectivity parameters) in order to construct the appropriate view of the feature. Note that in the example of FIG. 1, a transaction date of 7/21 is noted for delta 14 and stored in the database, but a future effect date of 7/28 for the change indicated by delta 14 is also stored in the database.

To implement the Baseline-Delta model in a database, a standard set of effectivity attributes is added to each of the entities represented in the database. Table I below lists the additional attributes that enable effectivity on the modeled entities in at least some configurations of the present disclosure. The fields provided can be added to any feature table requiring multidimensional effectivity.

TABLE I

| Field Name | Definition |
| --- | --- |
| Unique ID | A system generated identifier which uniquely identifies each row in the table |
| Feature ID | An identifier which uniquely identifies each feature in the table. A single feature could have multiple rows with the same feature id. |
| Transaction Type | Identifies the type of transaction for a given row in the baseline-delta implementation. Valid values include Baseline, Delta, Delete, and Undelete. |

TABLE I-continued

| Field Name | Definition |
|---|---|
| Durability | Indicates whether a change received from source was identified as a permanent or a temporary change. Valid values include Perm and Temp |
| Valid Start | Indicates the beginning of the period of validity for the feature or feature change |
| Valid End | Indicates the end of the period of validity for the feature or feature change |
| Transaction Start | Indicates the beginning of the period of presence. This is always the date/time when a feature or feature change was entered into the database. |
| Transaction End | Indicates the end of the period or presence. This is populated when the associate row has been superseded by another row. The transaction end value of the ended row must be exactly equal to the transaction start value of the superseding row. |
| Tailored ID | Identifies the Customer for which a tailored change to a feature has been made. |
| Extension ID | Identifies a specific product for which the feature has been created or changed. |

Using the set of effectivity attributes in Table I, a base table structure for a baseline-delta configuration is as indicated in Table II below. In one embodiment, Table II may also include a blank field (to the right of the table as it is shown) which is a placeholder for a set of attributes that is required to describe each modeled feature.

TABLE II

Feature Table

| Unique ID | Feature ID | Transaction type | Durability | Valid-start | Valid-end | Trans-start | Trans-end | Tailored ID | Extension ID |
|---|---|---|---|---|---|---|---|---|---|

The initial transaction in this exemplary scenario is a feature creation that creates a database entry for an airport having designator DIA, as shown in Table III below. The airport has an elevation of 5200 and a manager named "Joe." The airport is signified by the source of the transaction as having permanent durability, with a duration of "Until Further Notice." For configurations using a Baseline-Delta implementation, a baseline record 10 is created with each new feature creation. The baseline contains the multidimensional effectivity parameters, including bitemporal parameters as well as all of the attribute data for the initial version of the feature. The transaction type is set to 'BASELINE' to signify the baseline record. The Durability is set to "PERM" for permanent Baseline-delta records. The Tailored ID flag is set to null, because this initial transaction does not pertain to a tailored feature.

Next in this scenario, on 7/15, the airport's elevation is updated to 5150 with immediate effect, and until further notice. As seen in Table IV below, a new row is created capturing just the changed field (a delta) with appropriate effectivity settings for the change. Queries run against the database retrieve the appropriate baseline and delta(s) given the effectivity parameters of the query, and then combine the rows to provide the appropriate view of the data.

TABLE III

Feature Table

| Unique ID | Feature ID | Transaction type | Durability | Valid-start | Valid-end | Trans-start | Trans-end | Tailored ID | Name | Elevation | Manager |
|---|---|---|---|---|---|---|---|---|---|---|---|
| 1 | 1 | BASELINE | PERM | Jul. 1, 2009 | Dec. 31, 3000 | Jul. 1, 2009 | Dec. 31, 3000 | | DIA | 5200 | Joe |

TABLE IV

Feature Table

| Unique ID | Feature ID | Transaction type | Durability | Valid-start | Valid-end | Trans-start | Trans-end | Tailored ID | Name | Elevation | Manager |
|---|---|---|---|---|---|---|---|---|---|---|---|
| 1 | 1 | BASELINE | PERM | Jul. 1, 2009 | Dec. 31, 3000 | Jul. 1, 2009 | Dec. 31, 3000 | | DIA | 5200 | Joe |
| 2 | 1 | DELTA | PERM | Jul. 15, 2009 | Dec. 31, 3000 | Jul. 15, 2009 | Dec. 13, 3000 | | | 5150 | |

Next, on 7/21, the airport's manager is temporarily changed to "Paul" with a future effective date of 7/28, and expiration date of 8/14, with "Temporary" durability. In some configurations of the present disclosure and as illustrated in Table V below, the Baseline-Delta method treats temporary changes similarly to permanent changes. A new row is created containing the changed field value. The Durability is set to 'TEMP' to indicate the temporary nature of the source change. Queries work the same as they would with a permanent change.

TABLE V

Feature Table

| Unique ID | Feature ID | Transaction type | Durability | Valid-start | Valid-end | Trans-start | Trans-end | Tailored ID | Name | Elevation | Manager |
|---|---|---|---|---|---|---|---|---|---|---|---|
| 1 | 1 | BASELINE | PERM | Jul. 1, 2009 | Dec. 31, 3000 | Jul. 1, 2009 | Dec. 31, 3000 | | DIA | 5200 | Joe |
| 2 | 1 | DELTA | PERM | Jul. 15, 2009 | Dec. 31, 3000 | Jul. 15, 2009 | Dec. 13, 3000 | | | 5150 | |
| 3 | 1 | DELTA | TEMP | Jul. 28, 2009 | Aug. 14, 2009 | Jul. 21, 2009 | Dec. 31, 3000 | | | | Paul |

Queries can be broken into two different categories. The first category is "point in time queries" that request the state of a feature at a certain point in time, which may be in the past, the present, or the future. These queries may provide the state of the feature based upon what is known about the feature (period of presence), and what is valid for the feature (period of validity). Tailoring, Durability, and Extensions also apply to these types of queries.

The second category of queries is "time range queries" that provide a plurality of states of a feature as it changes over a valid time range. These are typically queried as of a certain point in time (period of presence). The results from this type of query may include time slices that present a snapshot of the feature for a time range in which the feature does not change. These time slices can be chained together and viewed by stepping through them in time order, thus presenting a vision of how the feature has changed throughout the valid time range.

Figure 2:
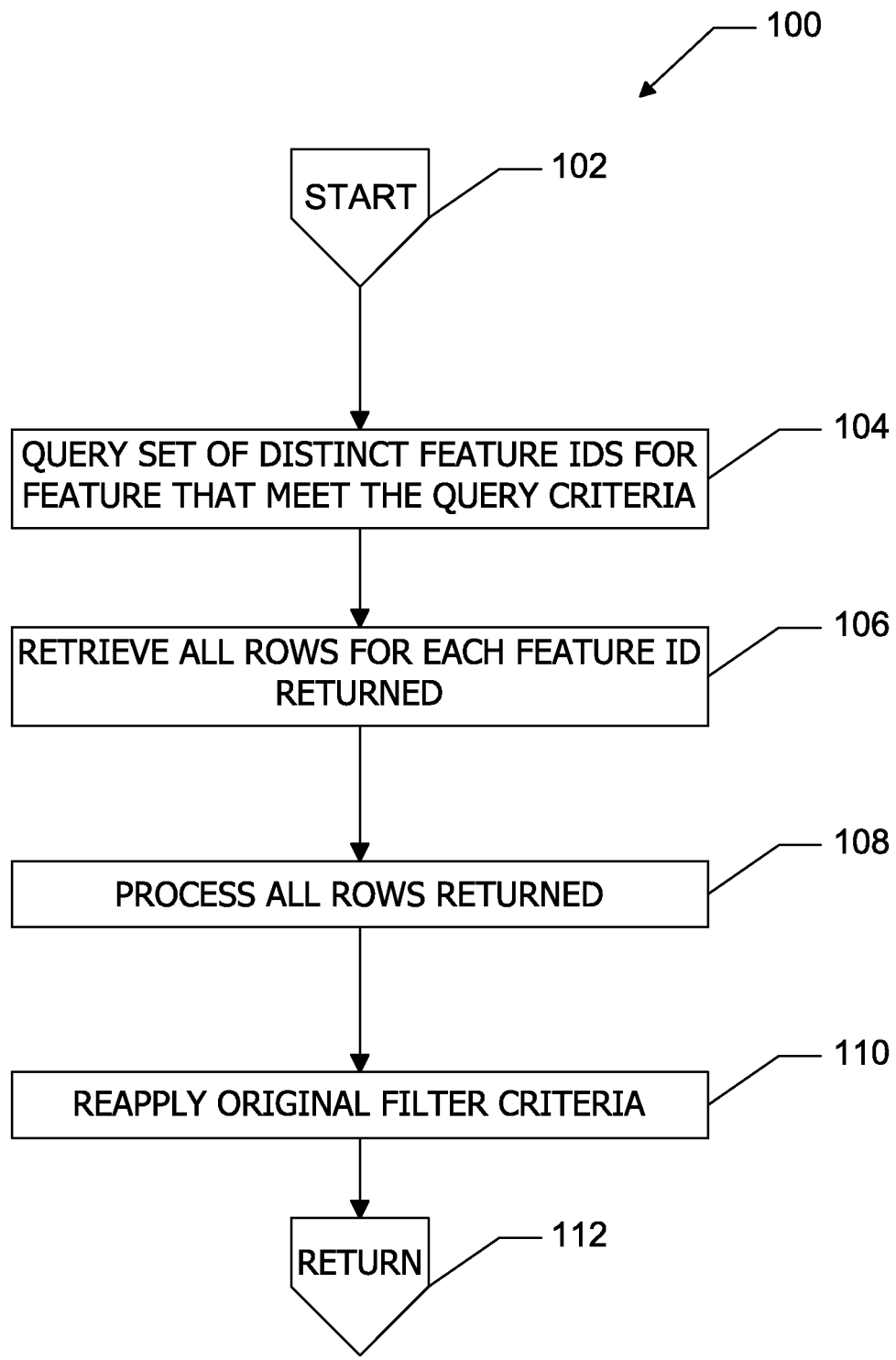
FIG. 2 is a flow chart of a method that can be used to resolve baseline-delta queries.

A majority of Baseline-Delta queries can be resolved using a process that mitigates issues that arise from storing data in the database in a non-standard way. The process can be housed entirely in the database, or in a mid-tier process that performs some of the baseline-delta row processing to create feature records for point-in-time and/or time range queries. In some configurations of the present disclosure and referring to flow chart 100 of FIG. 2, this process includes the following steps:

At block 104, query for the set of distinct feature IDs for features that meet the query criteria. Use effectivity query constraints additionally to limit the feature IDs returned to those that may meet the criteria during the effective time period, as well as satisfying the specified criteria in the other effectivity dimensions. Use logical OR constraints to ensure that all feature IDs whose features might meet the criteria are returned. Example: for a query to search for airports having an elevation above 1000 feet and an ICAO code starting with "K," an SQL "where" clause such as "where elevation>1000 OR Icao_code like 'K %'" is used. Note that even though the query requires both elevation>1000 and Icao_code like 'K %', an OR is used in the SQL "where" clause to catch database records meeting either criteria.

At block 106, retrieve all rows for each Feature ID retrieved in block 104. Use effectivity constraints additionally to limit the rows returned to those that meet the criteria during the effective time period and that satisfy the other effectivity criteria.

At block 108, process all rows returned in block 106. Combine all rows with the same Feature ID by starting with the Baseline data, and applying all deltas incurred to the baseline.

At block 110, reapply the original filter criteria to all rows resulting from block 108, this time using the logic semantics from the actual filter criteria. For the present example, an SQL "where" clause such as "where elevation>1000 AND Icao_code like 'K %'" is used to ensure that the feature row containing the baseline with all the deltas applied meets the original filter criteria. A temporary in-memory table is used in some configurations to perform this step. In some configurations using the temporary, in-memory table, data from block 106 is written to the table, and SQL statements are used to filter the rows in accordance with the query constraints.

Figure 3:
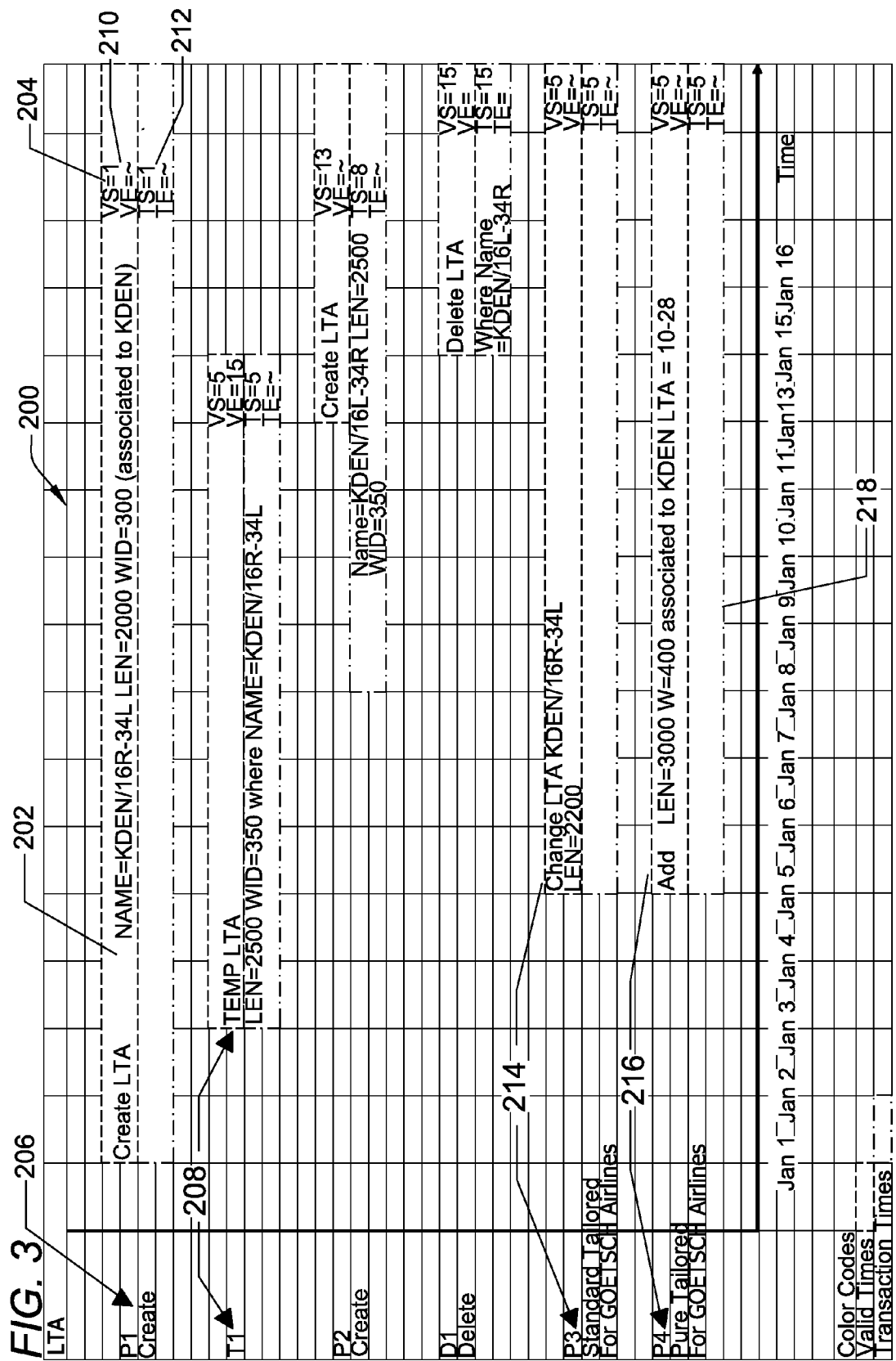
FIG. 3 is an example tailoring scenario diagram showing the parts of such a diagram.

To describe in more detail how configurations of the present disclosure are implemented and referring to chart 200 of FIG. 3, examples of data and extract scenarios are provided using simulated data. Examples of queries created against sets of features are also provided to simulate data extraction and maintenance. Chart 200 is an example showing how data is laid out. An example transaction 202 is shown in chart 200 with its data, with valid start and end times 204. Valid times are shown at 210, while transaction time ranges are shown at 212. A "—" (tilde) indicates "until further notice." The start and end times 204 each represent a day of the month, which, for purposes of this example, is a date from January 1 to January 31. (In an actual implementation, dates can be encoded differently to permit any desired range, including a range much longer than a single month.) The transaction type and number 206 for each transaction is sequenced in order, from top to bottom. A temporary transaction 208, a standard tailored transaction 214, and a pure tailored transaction 216 is also shown in chart 200. A time axis 218 is at the bottom of chart 200, with increasing time running from left to right. Chart 200 also shows the data contained in each transaction, for example, transaction type (add, create, change, delete), feature type (Airport, Landing Takeoff Area, Runway, etc), natural key information (identifier) of the feature to which the data applies, the feature information (attribution), tailoring information, and bitemporal effective dates.

Standard tailoring of attributes on a feature and the addition of tailored features are common data maintenance scenarios. Transaction 214 shows a standard tailored change setting the length of LTA KDEN/16R-34L to 2200 for Goetsch Airlines. Transaction 216 shows the addition of a pure tailored LTA feature for Goetsch Airlines.

A suitable Baseline-Delta implementation is represented in FIG. 4. The standard tailoring on baseline entry 302 LTA KDEN/16R-34L is accomplished by adding a delta row 304 for the length attribute change to 2200, with the tailored_id set to Goetsch. At query or extract time the standard tailored feature is calculated by taking the baseline, applying the applicable standard delta rows, and then applying the applicable tailored rows. Subsequent changes to the standard attributes of LTA KDEN/16R-34L are automatically applied. The same point in time query on 1/9 would require a two step query method described elsewhere. The result would be a feature that includes Unique IDs 1 and 6 at rows 302 and 304, respectively, combined together, and Unique ID 7 at row 306.

In addition to the ability to tailor data, it is necessary to untailor data (i.e., terminate either pure or standard tailoring for a given feature and revert to using the standard version). For example, it may be necessary to untailor an attribute that had been previously tailored for a customer. The desired outcome of this type of untailoring is to have the value revert to the value contained in the standard version of that feature for that customer. In another case, it may be necessary to untailor an entire feature. For example, a customer may have many attributes tailored for a given feature, and later may wish to revert to using all of the attributes of the standard version of the feature.

Figure 5:
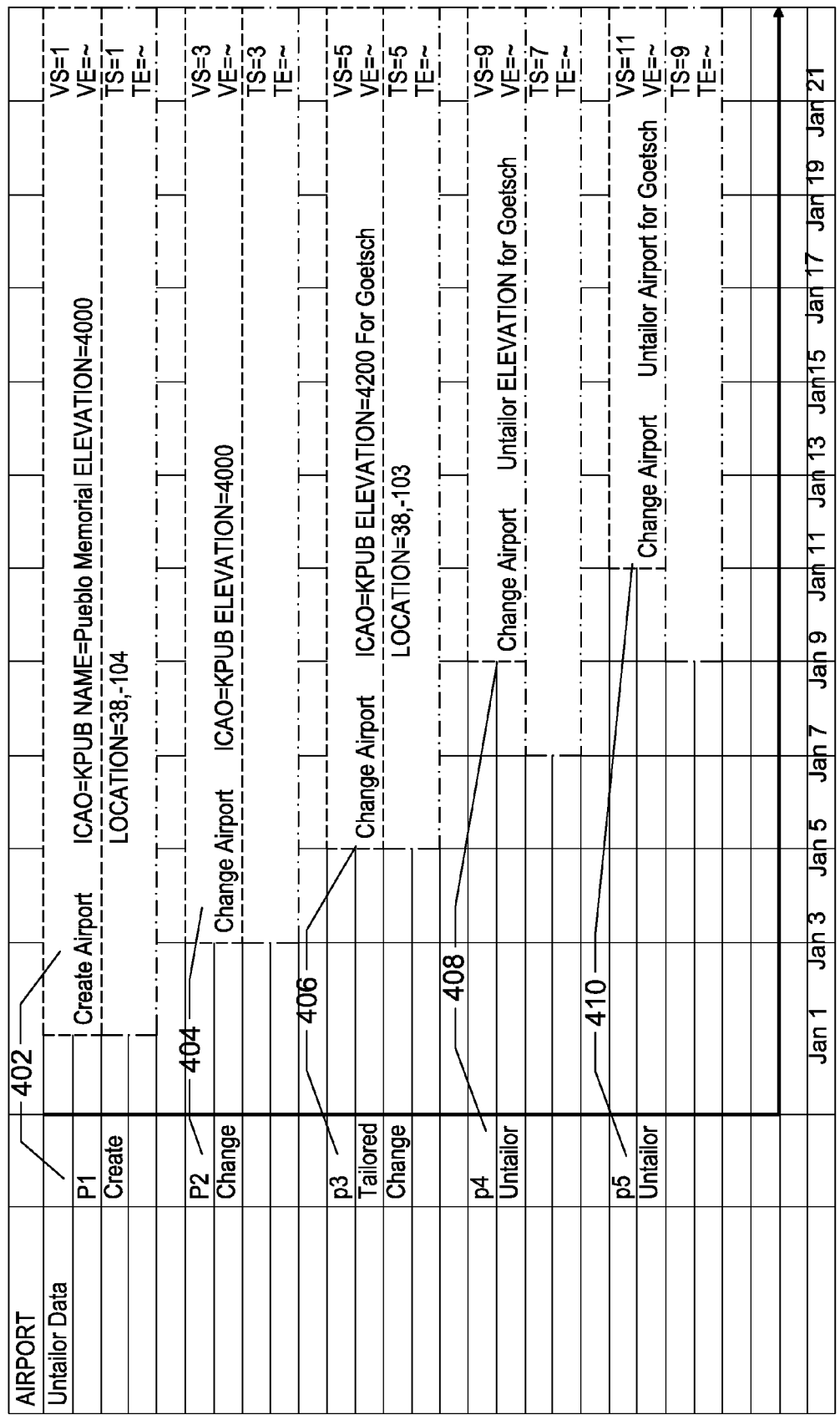
FIG. 5 is an example untailoring scenario diagram.

For example, and referring to FIG. 5, transaction 402 creates the airport KPUB. Transaction 404 changes the airport elevation to 4400. Transaction 406 is a tailored change to the elevation and location. Transaction 408 then untailors the elevation attribute, reverting it back to the standard version. Transaction 410 untailors the entire airport, which, in this particular example only, is the same as untailoring location, the remaining attribute.

FIG. 6 represents a suitable baseline-delta implementation of transaction 402, 404, and 406. This implementation performs similar steps as with tailored transactions. Transaction 408 is performed in some configurations of the present disclosure by using the data from row 502 that tailors the attribute and setting the transaction end date of the query result to the transaction start date of the untailoring. Because transaction 408 is a future effective change, the tailoring is valid from its initial start date to the date of the untailoring. This date is taken into account by copying the "transaction ended" tailored row for the attribute into a new row 602 as illustrated in FIG. 7 and setting the valid end date to the valid start date of the untailoring.

FIG. 8 illustrates a method for untailoring the feature specified by transaction 410 for Goetsch. For example, any remaining tailored attributes are untailored, namely (for this example only), the location attribute. Untailoring row 702 is used for this purpose.

A tailored query for Goetsch done on 1/10/2008 for features valid on 1/10/2008 would return rows with Unique IDs 1, 2, and 6. The row with Unique ID 6 tailors the location for Goetsch but ends on 1/11/2008. The rows with Unique IDs 3 and 4 aren't retrieved because they have been transaction ended. The tailored row with Unique ID 6 is not valid.

Some source providers may provide corrections to prior source data, such as the addition or deletion of features, the changing of attributes, or to the effective dates of any transaction. A source provider identifies the transaction as a correction, and is explicit about what is being corrected. If these requirements are not met, the transaction can be captured as a feature change.

Figure 9:
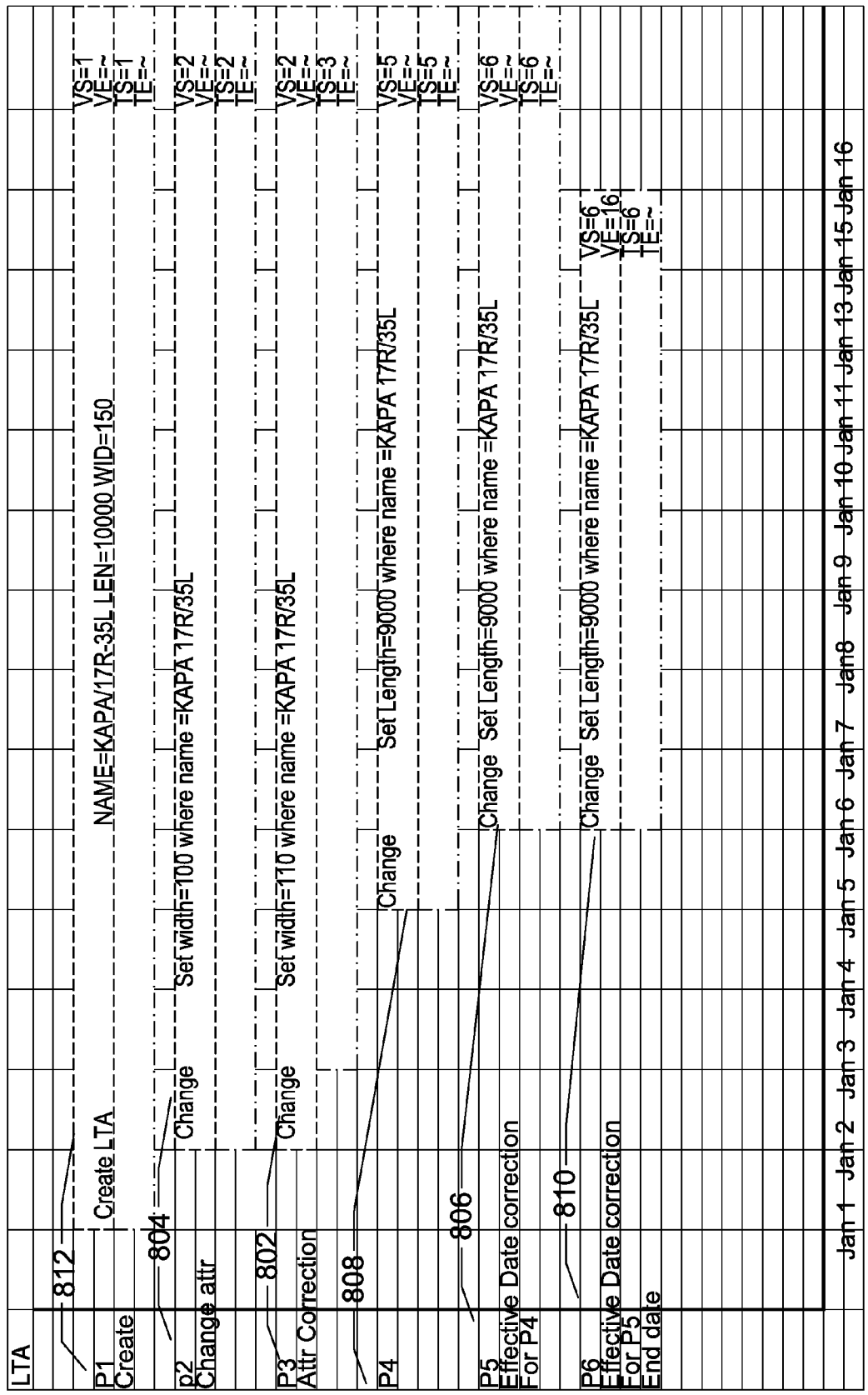
FIG. 9 illustrates an example correction scenario using both attribute corrections as well as effective date corrections.

For example and referring to FIG. 9, the P3 transaction 802 is a correction to the attribute change done by the P2 transaction 804, correcting the width to 110 from its previous change value of 100. The P5 transaction 806 corrects the effective start date of the P4 change transaction 808. The P6 transaction 810 is an effective end date correction to P5. Transactions P5 and P6 ultimately turn transaction P4 into a closed ended permanent change.

To implement the scenario using a Baseline-delta method and referring to FIG. 10, some configurations of the present disclosure capture the feature creation 912 done by the P1 transaction 812 (shown in FIG. 9), and then the change 904 to the LTA width in the P2 transaction. Referring to FIG. 11, the P3 correction 802 on the P2 transaction 804 is performed by setting the transaction end date of the P2 transaction 804 to the transaction start date of the P3 transaction 802, which preserves transaction history. A correction row 1002 is then written as a delta, with the corrected value of 110 written for the LTA width. Referring to FIG. 12, the P4 change transaction 804 is not unusual and is applied as expected with a delta row 1102 using the given effective dates and stores the changed length value as 9000.

Referring to FIG. 13, the P5 correction 806 to the valid start date of the P4 transaction 808 is performed in some configurations by setting the transaction end date of transaction P4 to the transaction start date of transaction P5, which preserves transaction history. The correction row 1202 is then written as a delta row with the corrected value of 1/6/2008 stored for the valid start date and with the remaining values from the corrected row. Referring to FIG. 14, the valid end date correction done by the P6 transaction 810 for the P5 transaction 806 is performed by setting the transaction end date of P5 to the transaction start date of P6. The correction row 1302 is then written as a delta, with the corrected value of 1/16/2008 stored for the valid end date, and with the remaining values from the corrected row.

Figure 15:
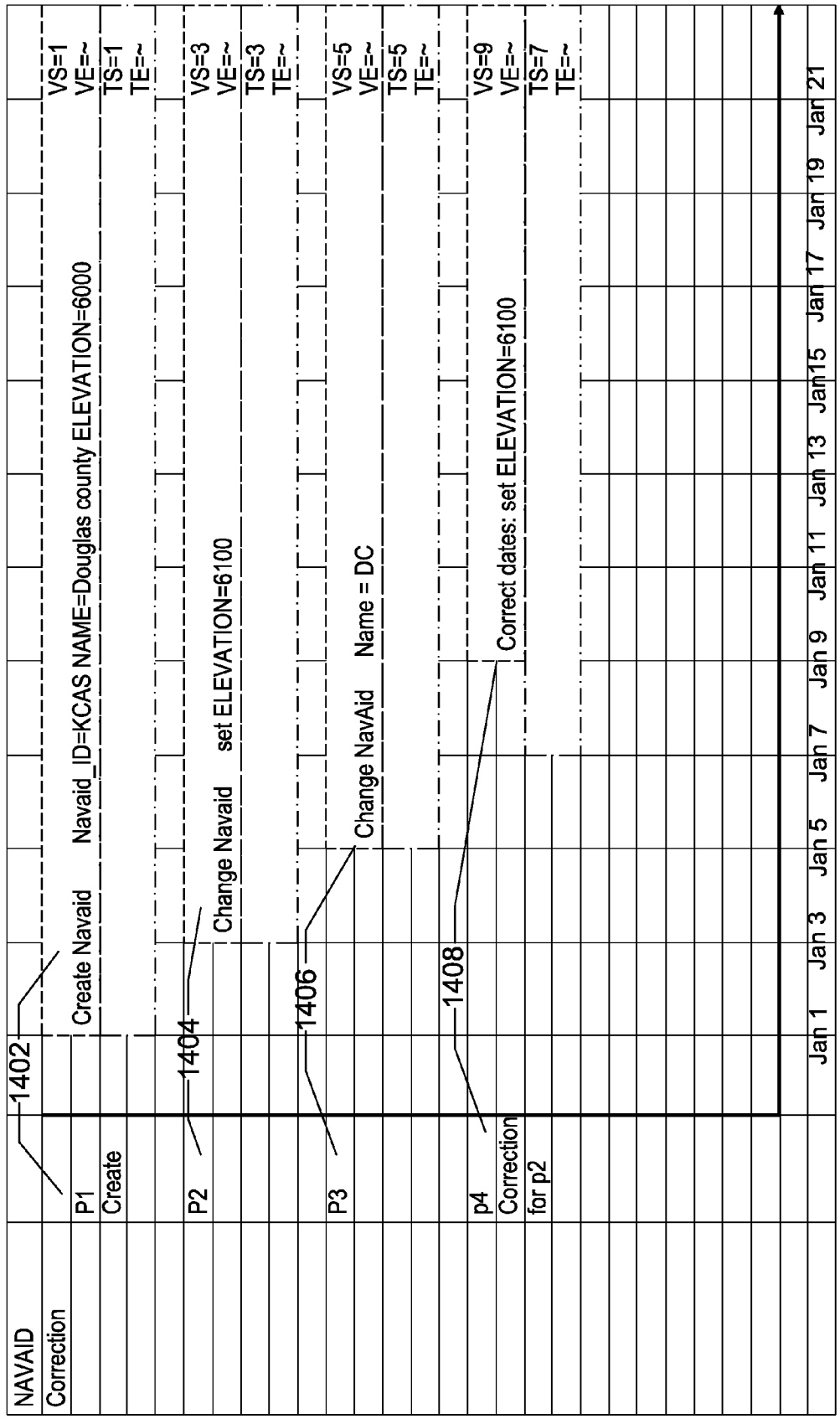
FIG. 15 illustrates an example complex correction scenario illustrating a correction for an activity in which other activity has occurred since.

A more complex scenario with having a Navaid having two changes and a correction applied to the first change is represented in FIG. 15. The P1 transaction 1402 creates the NavAid. The P2 transaction 1404 and the P3 transaction 1406 modify the elevation and NavAid name respectively. The P4 transaction 1408 then corrects the effective start date of the elevation change in the P2 transaction 1404.

In some configurations of the present disclosure and referring to FIG. 16, a baseline-delta method is used to capture the P1 transaction 1402 as a baseline 1502 for the NavAid. The P2 change transaction 1404 and the P3 change transaction 1406 are captured as delta 1504 and delta 1506, respectively. Next, and referring to FIG. 17, the P4 correction 1408 is applied against the P2 transaction 1404 by setting the transaction end time of the P2 transaction 1404 record to the transaction start time of the P4 correction 1408. This correction preserves transaction history and prevents "as of date" queries after 1/6/2008 from returning an uncorrected row. Next, the corrected row 1602 is created using the corrected valid start date from the P4 correction 1408. Because the state of the feature is derived at extract time using multi-dimensional effectivity parameters, the P3 transaction 1406 is applied. A query with transaction and valid dates of 1/10/2008 would select and apply rows 1, 3, and 4 to form the NavAid.

In some configurations of the present disclosure, a database maintainer receives both permanent data and temporary data, as may also receive permanent data changes or temporary data changes. The property of being permanent or temporary is termed durability and is represented as another axis in the multi-dimensional effectivity model. While durability is very similar to tailoring, there are differences in the extract requirements of durable data.

Figure 18:
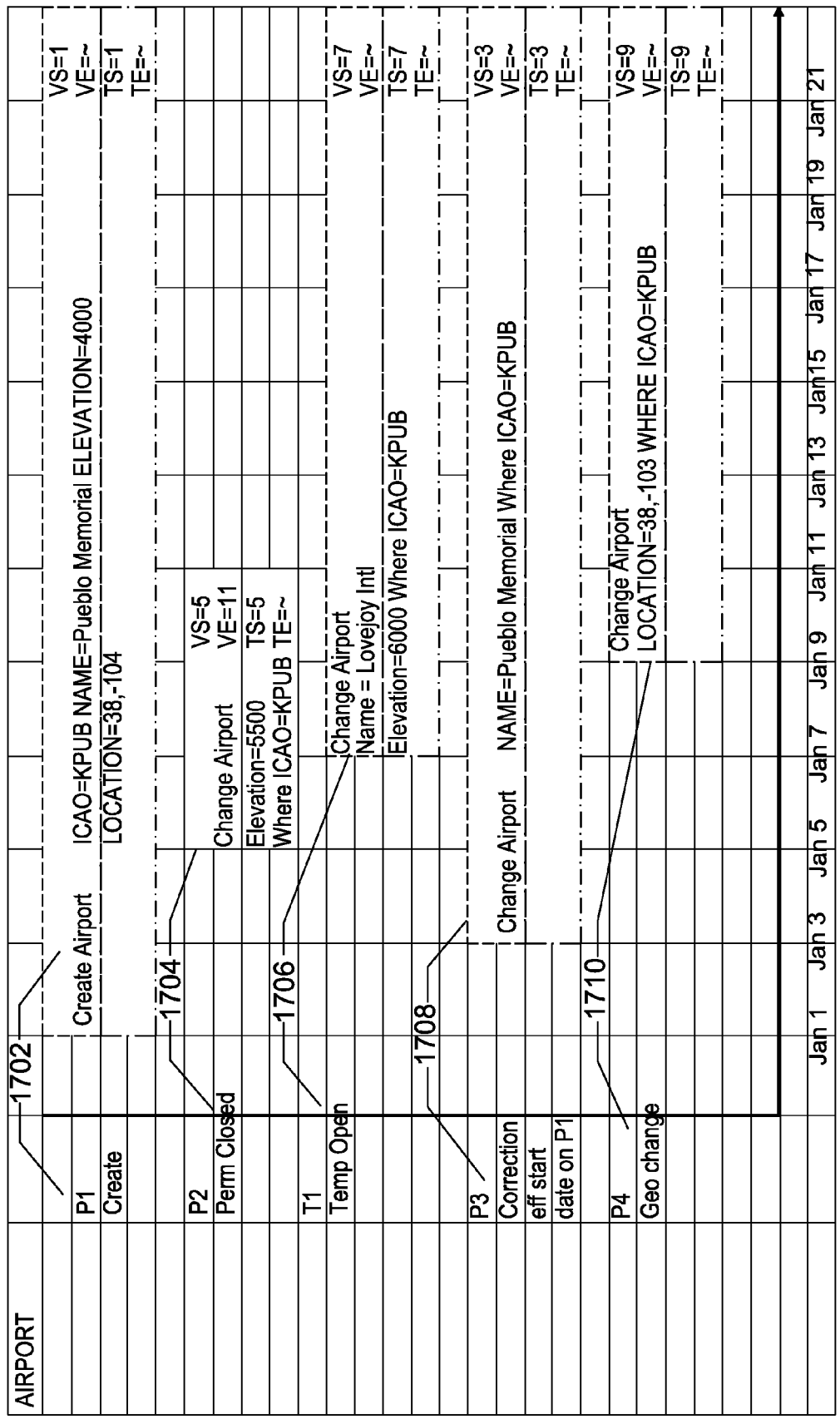
FIG. 18 illustrates an example durability scenario that shows a closed ended permanent delta as well as an open ended temporary delta.

For example, "Notice to Airmen" (NOTAM) products typically need only temporary data, whereas charting products either need just permanent data, or permanent data and temporary data with a specified duration and window of start time. Other products may need both temporary and permanent data, regardless of duration or start times. Since there is such a wide variety of extract requirements, permanent data and temporary data are isolated from each other and permanent changes and temporary changes are selectively applied to the features when extracted in accordance with the needs of various specific products. A durability field marks source data as either permanent or temporary. For example and referring to FIG. 18, changes to an airport include a temporary change to an airports name and elevation, whose duration has been set until further notice (UFN). The P1 transaction 1702 creates an airport having the ICAO designation KPUB with name "Pueblo Memorial," elevation 4000, and location (38, −104). The P2 transaction 1704 changes the elevation to 5500 permanently. The T1 transaction 1706 changes the airport name to "LoveJoy Intl," and the elevation to 6000 temporarily. The P3 correction 1708 corrects the effective start date of the PI transaction 1702. The P4 correction 1710 permanently changes the airport location to (38, −103).

In some configurations of the present disclosure and referring to FIG. 19, a baseline-delta implementation captures temporary changes in the same manner as permanent changes, except for setting a durability flag to "temp." The temporary attribute changes made by the T1 transaction 1706 are split into row 1802 and row 1804, one for each attribute change. At query or extract time, if temporary data is desired, the temporary changes provided by row 1802 and row 1804 are added during the computation of the feature.

Figure 20:
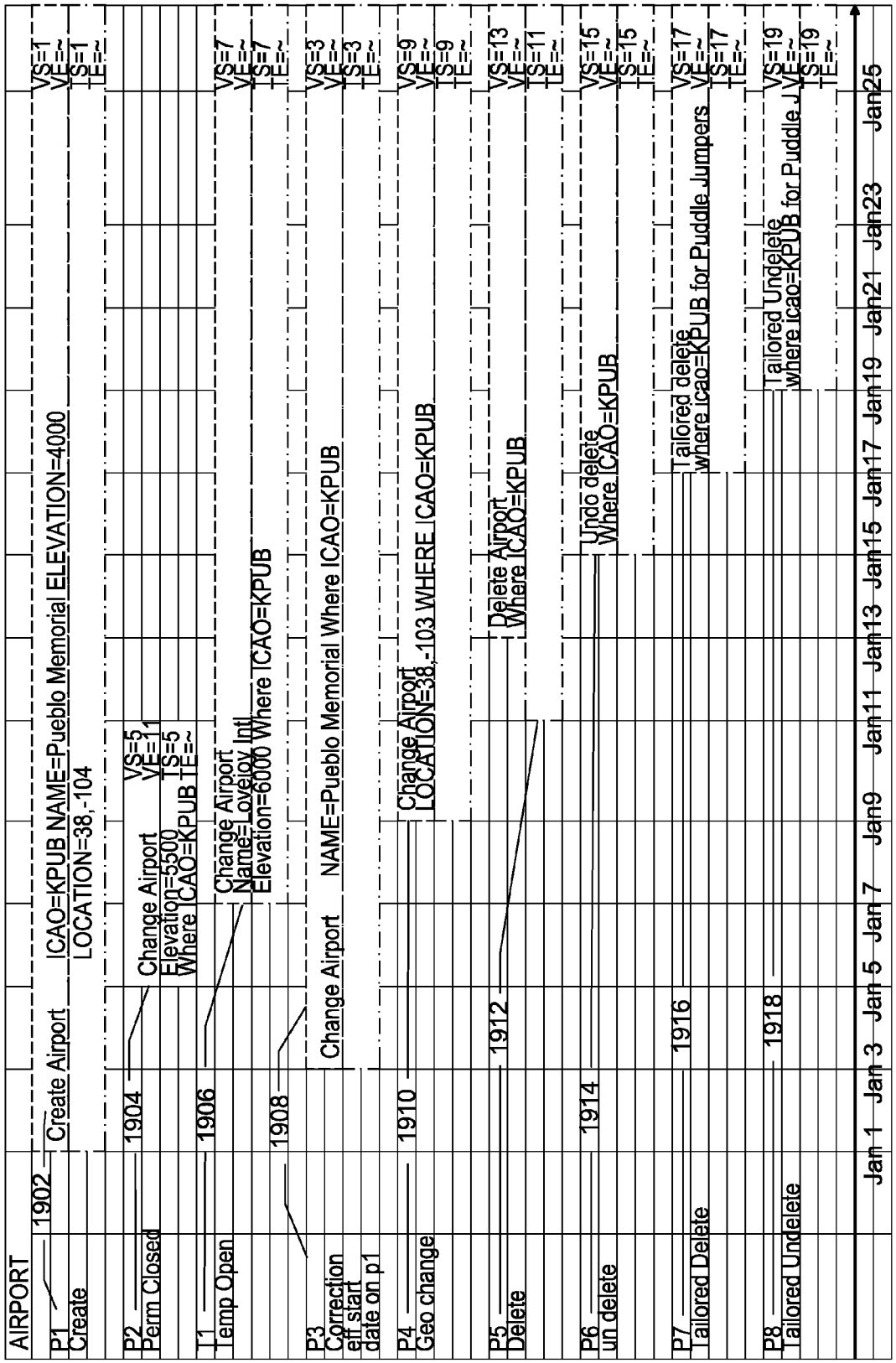
FIG. 20 illustrates an example deletion and undeletion of features that contain geographic data, tailored data, as well as data that has durability.

At times, in some configurations and referring to FIG. 20, source data is received indicating the deletion of a feature. To keep a history of the deleted feature, the feature is not actually removed from the database but is, instead, logically deleted using, for example, a delete flag. Additionally, source data may occasionally request that the deleted feature is undeleted, i.e., restored back to its prior state. To maintain the history of the feature, it is necessary to retain, in the features database, the period in which the feature was marked as deleted. In some configurations, customers may request the database maintainer to perform a tailored delete of a feature so that one or more standard features do not appear in their tailored products, even though the database maintainer desires to retain the standard version of the feature for other products. Customers may also choose to tailor undelete their features. In the example illustrated in FIG. 20, the P1 transaction 1902 creates an airport with ICAO designation KPUB, name "Pueblo Memorial," elevation 4000, and location (38, −104). The P2 transaction 1904 permanently changes the elevation of the airport to 5500. The T1 transaction 1906 temporarily changes the airport name to "LoveJoy Intl" and the elevation to 6000. The P3 transaction 1908 corrects the name of the airport to "Pueblo Memorial" and the effective start date of the P1 transaction 1902. The P4 transaction 1910 changes the location of the airport to (38, −103). The P5 transaction 1912 deletes the airport from the database, and the P6 transaction 1914 undoes the deletion. The P7 tailored deletion transaction 1916 deletes the airport for the customer "Puddle Jumpers," and the P8 tailored undelete transaction 1918 undeletes the airport for the customer "Puddle Jumpers."

In some configurations of the present disclosure and referring to FIGS. 21 and 22, a baseline-delta method configuration of the present disclosure does not use a delete flag but instead sets the transaction type to "delete" or "undelete". The P1 transaction 1902 adding the airport is added to the database as row 2002. The P2 transaction 1904 changing the airport elevation to 5500 is added to the database as row 2004. The T1 transaction 1906 temporarily changing the airport name to "LoveJoy Intl" and the elevation to 6000 is added to the database as row 2006 and row 2008. The P3 transaction 1908 correcting the name and effective start date of the airport are added to the database as row 2010. The P4 transaction changing the location of the airport is added to the database as row 2012.

The P5 transaction 1912 deleting the airport from the database is added to the database as row 2014, in which the P5 transaction 1912 is the deletion of a standard feature. The transaction type of row 2014 is set to delete with a valid start date of 1/13/2008, which is the date on which the deletion becomes valid. The P6 undelete transaction 1914 is handled in a similar manner by the addition of row 2016. The P5 delete transaction 1912 is undone by the P6 undelete transaction 1914. Row 2016 thus has its transaction type set to undelete and the valid start date set to 1/15/2008, the date on which the airport is undeleted.

In some configurations and referring to FIG. 23, the Baseline-Delta technique for making a tailored delete of a feature is the same as standard delete except that Tailored_id is set. Row 2102 has its Transaction Type set to delete, the tailored_id set to Puddle Jumpers, and the valid start date set to 1/17/2008, which is the date the delete begins. Referring to FIG. 24, to undelete the tailored delete of a feature in row 2102, a new row 2202 is added for the feature. In row 2202, the Transaction Type is set to undelete, the tailored_id is set to Puddle Jumpers, and the valid start date is set to 1/19/2008. Tailored queries executed after 1/19/2008 will retrieve rows 2004, 2006, 2008, 2010, 2012, 2014, 2016, 2102, and 2202. The transactions on the feature are then computed and the delete and undelete will cancel each other out, leaving the standard version of the feature.

Occasionally, a database maintainer may receive source data that "clears" an attribute, i.e., the source data indicates that a feature attribute that had a value no longer has a value. After an attribute is cleared, in some configurations of the present disclosure it is possible to reestablish a value for the attribute. Therefore, some configurations define a value for each data type that indicates the attribute has been cleared. For the purposes of the present example, the value <CLEAR> is used for this indication. Other values can be created for other data types. For example and referring to FIG. 25, a scenario is presented showing the creation of a feature, a clearing of an attribute on that feature, and then the setting of a new value on the previously cleared feature. The scenario first shows the P1 transaction 2302 creating the Navaid KCAS. The P2 transaction 2304 then clears the elevation field, which was previously 6000. Finally, the P3 transaction 2306 sets the elevation to 5500.

In some configurations of the present disclosure and referring to FIG. 26, the P1 transaction 2302 and the P2 transaction 2304 are received and converted to row 2402 and row 2404, respectively, in the database as shown. Row 2404 is a delta row that sets the elevation to <CLEAR>. Queries on or after 1/3/2008 return the feature with the elevation cleared. Referring to FIG. 27, the P3 transaction 2306 produces a new row 2502. Row 2502 is a delta row with the new attribute value, which in this example is a data setting the elevation to 5500.

Figure 28:
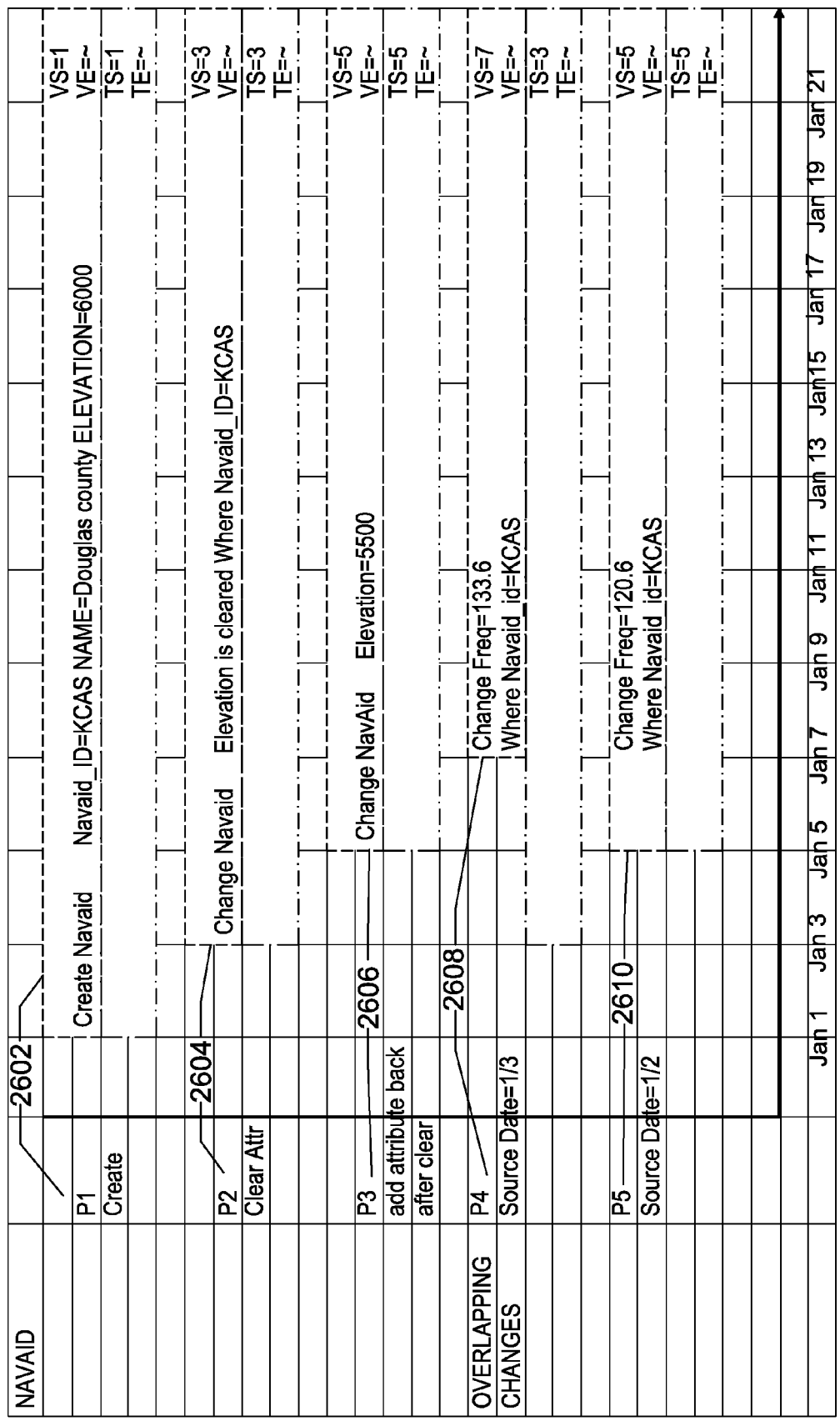
FIG. 28 illustrates an example overlapping changes scenario.

Referring to FIG. 28, FIG. 29, and FIG. 30, a database maintainer may occasionally and unknowingly receive source data out of sequence. For example, a database maintainer may receive source data P1 transaction 2602 on 1/1/2008, issued by the source on the same day. The database maintainer enters the data into the database, creating row 2702. The database maintainer then receives the P2 change transaction 2604 and enters the source changes, and the database creates row 2704. The database maintainer then receives the P3 transaction 2606 adding the attribute back after the P2 transaction 2604. The database maintainer enters the P3 transaction 2606, wherein in response, the database creates row 2706.

In the scenario represented by FIG. 28, the P4 transaction 2608 is received by the database maintainer on 1/3/2008 and applied with a valid start date of 1/7/2008. The P4 transaction 2608 was sent from its source on 1/3/2008. The database maintainer receives the P5 transaction 2610 on 1/5/2008, and this transaction is valid beginning on 1/5/2008. The P5 transaction 2610 was sent from its source on 1/2/2008 and was received by the database maintainer out of order. The analyzed result of these changes should be that as of 1/5/2008, and valid from 1/3/2008 to 1/5/2008, the NavAid has no frequency set. From 1/5/2008 to 1/7/2008 the frequency is set to 120.6. From 1/7/2008 to until further notice (UFN), the frequency is 133.6. However, in this case, the database maintainer has ignored the source date and applied the source changes in order received.

To reconcile what otherwise might be ambiguous or incorrect responses to queries, in various configurations of the present disclosure and referring to FIG. 29, the P3 transaction 2606 is included as a delta row 2706 in the database. The P2 transaction 2604 and the P4 transaction 2608 that both occur on 1/3/2008 are recorded as separate transactions in row 2704 and row 2708, respectively. When the P5 transaction 2610 is recorded and referring to FIG. 30, a delta row 2810 is added with the frequency set to 120.6, and the delta row 2810 has a valid start date of 1/5/2008. If a query were executed with an "as of date" and a valid date of 1/12/2008, the response would be computed using all 5 rows 2702, 2704, 2706, 2708, and 2810. The result would NavAid KCAS having an elevation of 5500 and a frequency of 120.6. The frequency is 120.6 because delta row 2810 has a transaction date of 1/5/2008, which is later than and overrides delta row 2708, which has a transaction date is 1/3/2008.

Figure 31:
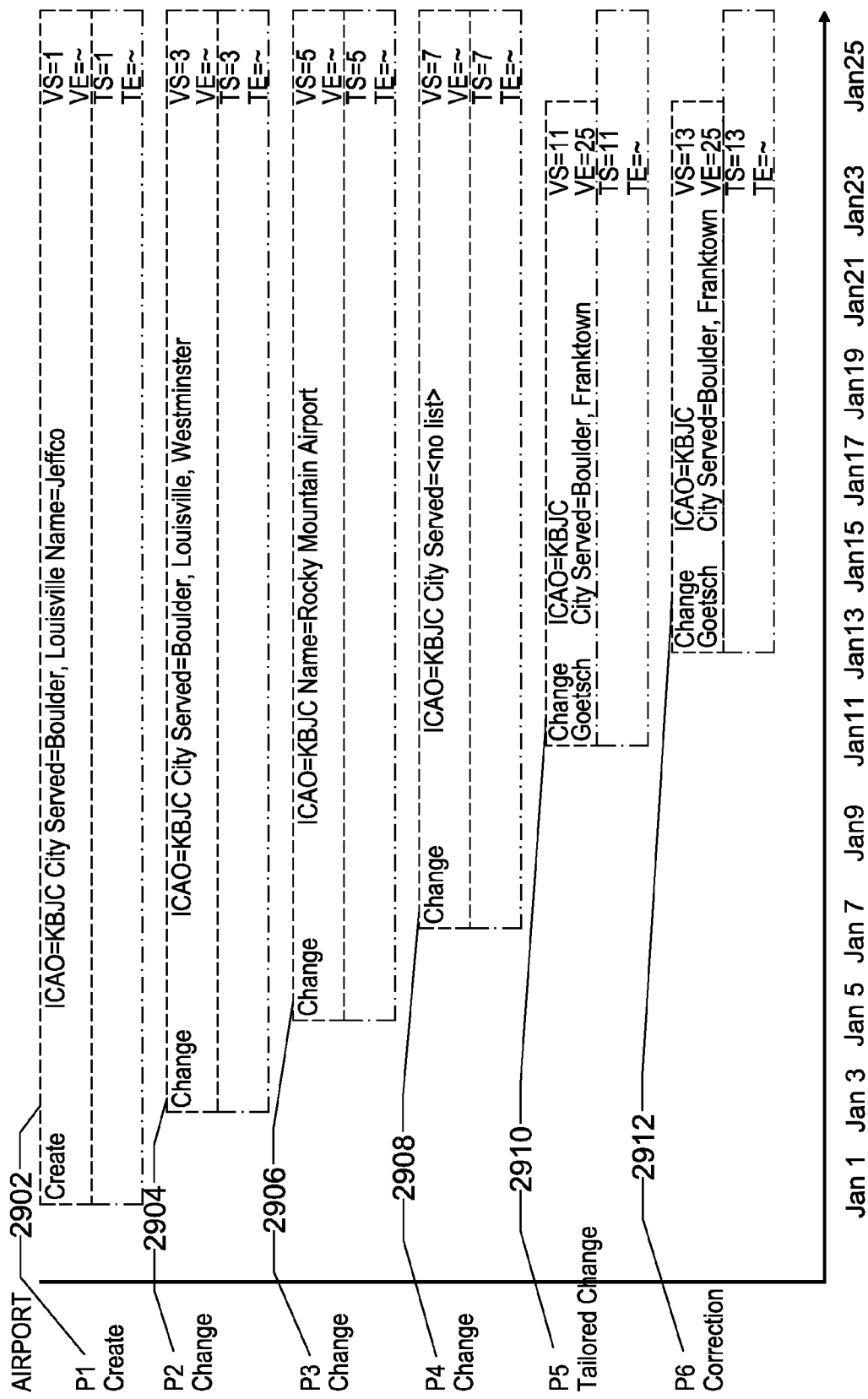
FIG. 31 illustrates an example complex object relationship scenario.

In some configurations, it may be necessary to store attributes of a feature that are a list of values or a list of complex objects. The list of values as a whole has effectivity, but not the individual items in the list. However, it may be necessary for a configuration to be able to search for an individual item in the list. The list of values or complex objects may be considered as a feature attribution because they are used for no other purpose than to describe the overall state of the feature. However, since they are represented in a list, they are typically not stored in a single column in a relational database but rather in a related column using a one-to-many relationship. This is known as a complex object relationship. An example of a complex object scenario is shown in FIG. 31. This scenario is an airport feature with a list of cities the airport serves. The P1 transaction 2902 creates an airport, KBJC that serves the cities of Boulder and Louisville. The P2 transaction 2904 changes the list of cities served to Boulder, Louisville and Westminster. The P3 transaction 2906 then changes the name of the airport to Rocky Mountain Airport. The P4 transaction 2908 then clears the city served list. The P5 transaction 2910 is a tailored change to the feature, setting the city serves list to Boulder and Franktown for a specific customer (Goetsch). Finally, the P6 transaction 2912 corrects the start date of the tailored P5 transaction 2910.

Figures 32, 33:
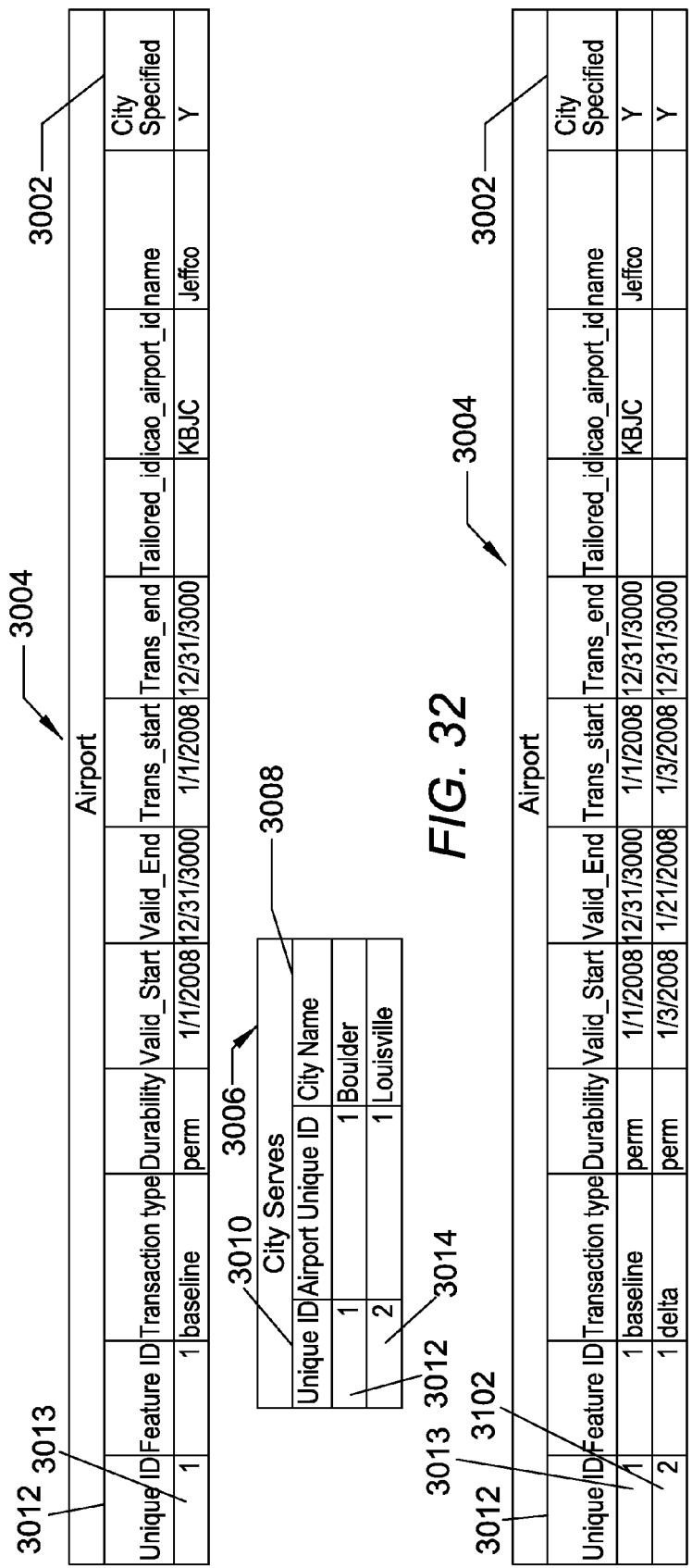
FIG. 32 illustrates a baseline-delta database module implementation of the complex object relationship scenario of FIG. 31 for transaction P1.
FIG. 33 illustrates a baseline-delta database module implementation of the complex object relationship scenario of FIG. 31 for transactions P1 and P2.

Referring to FIG. 32, the complex object relationship is implemented in some configurations of the present disclosure using a baseline-delta method by adding a "specified" column 3002 to the main feature table 3004 and then creating a related table 3006 that contains a column 3008 for the items in the attribute list. The related table has no effectivity, but includes a key 3010 using the unique id 3012 of feature table 3004. The related table 3006 in this example is named "City Serves." The "specified" column 3002 in the example is "City Specified," and has three possible values. The values are "Y," indicating values for this transaction are stored in the City Serves table, "U," indicating that the values for City Serves have been unset (no list), and "N," indicating that this row does not modify or use the City Serves relationship.

For example and again referring to FIG. 32, airport table 3004 and city serves table 3006 for the P1 transaction 2902 that create the baseline for KBJC are shown. The baseline row 3013 is like any other row except that there is an additional column, City Specified 3002. Because the P1 transaction 2902 specifies that the airport serves the cities of Boulder and Louisville, the City Specified column 3002 is set to "Y" and two rows are added to the City Serves table 3006 in which there is row for Boulder 3014 and a row for Louisville 3016.

Continuing the present example and referring to FIG. 33, the P2 transaction 2904 adds a new city to the City Serves list 3006. A delta row 3102 on the airport table 3004 is added with the City Specified column 3002 set to "Y" indicating that a new set of cities is being created. Then a row for each city is created in the City Serves table and the airport Unique ID row 3104 is set to 2 for each row for each city, namely row 3106, row 3108, and row 3110.

Figure 34:
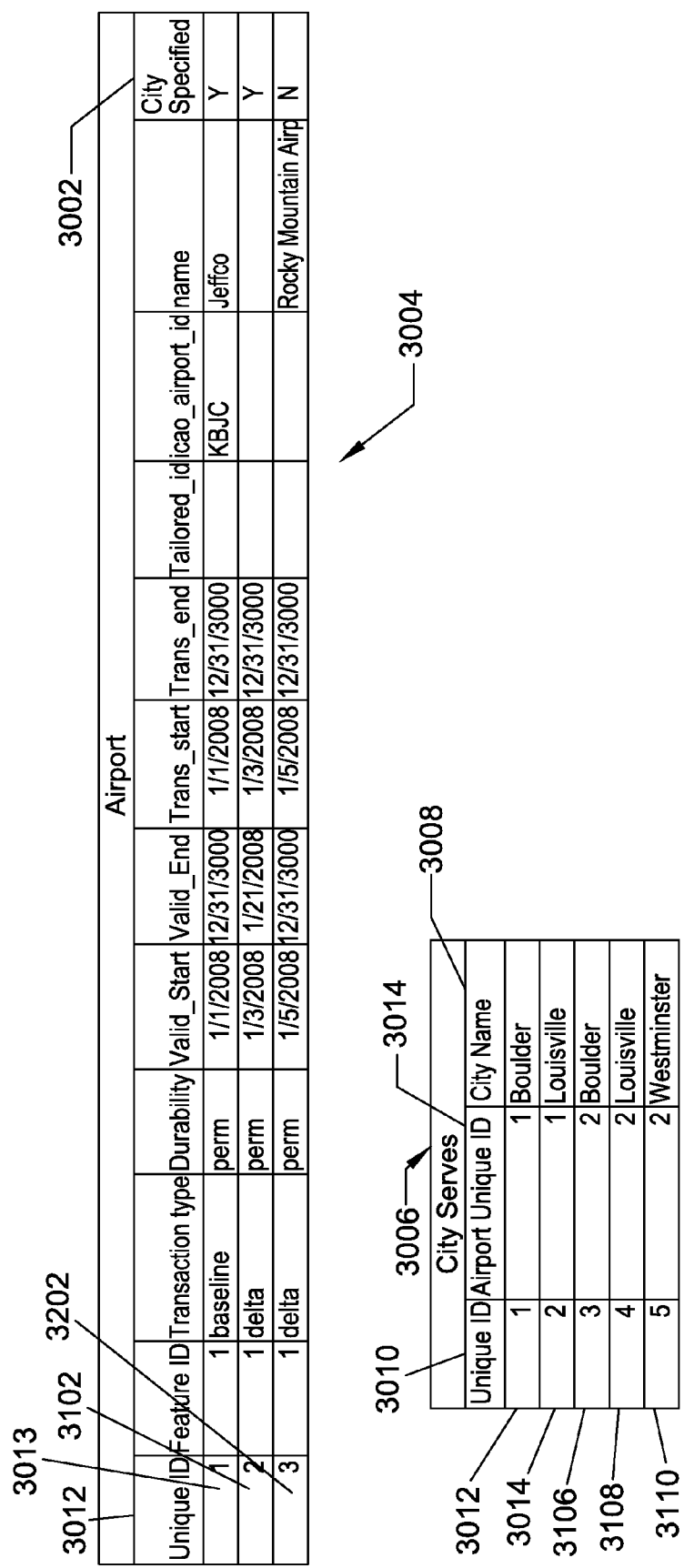
FIG. 34 illustrates a baseline-delta database module implementation of the complex object relationship scenario of FIG. 31 for transactions up to transaction P3.

Referring now to FIG. 34, the P3 transaction 2906 changes the airport name to Rocky Mountain Airport. This change results in a delta row 3202 in the airport table 3004 for the name change. The City Specified field 3002 is set to "N" because the list of cities served is unchanged and it is unnecessary to create a new set of entries in the City Serves table 3006. A query on 1/5/2008 thus retrieves the rows 3013, 3102, and 3202 with Unique IDs 1, 2, and 3, respectively, from the airport feature table 3004. The airport feature is assembled and the City Serves complex object is retrieved for row 3201 with Unique ID 2 in the airport table 3004, because it was the last row with the City Specified as "Y". This results in the list of cities that are served by the airport, namely, the list consisting of Boulder, Louisville and Westminster, from city serves table 3006 rows 3106, 3108, and 3110, respectively.

Figure 35:
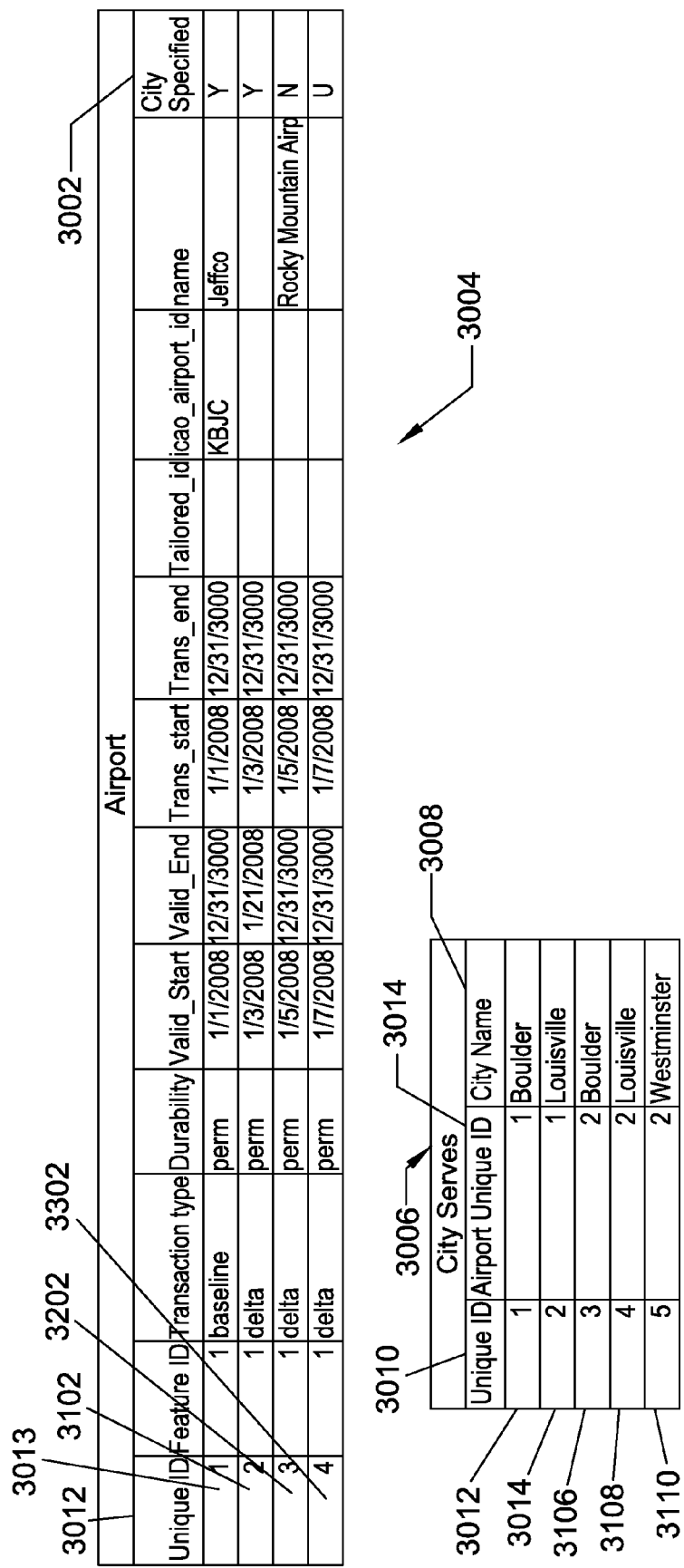
FIG. 35 illustrates a baseline-delta database module implementation of the complex object relationship scenario of FIG. 31 for transactions up to transaction P4.

Referring now to FIG. 35, the P4 transaction 2908 sets the list of cities served to an empty list. A delta row 3302 is added for the feature with City Specified 3002 the only changed field. The City Specified field is set to "U" to indicate that the City Serves table 3006 no longer contains rows for the feature. A query on 1/7/2008 retrieves rows 3013, 3102, 3202, and 3302 with Unique IDs 1, 2, 3, and 4, respectively. The state of the feature is calculated and the City Specified field 3002 used is from row 3302 with Unique ID 4 because it contains the latest state. The City Specified field 3002 contains "U" to indicate that the Airport has no rows in the City Serves table 3006.

Figure 36:
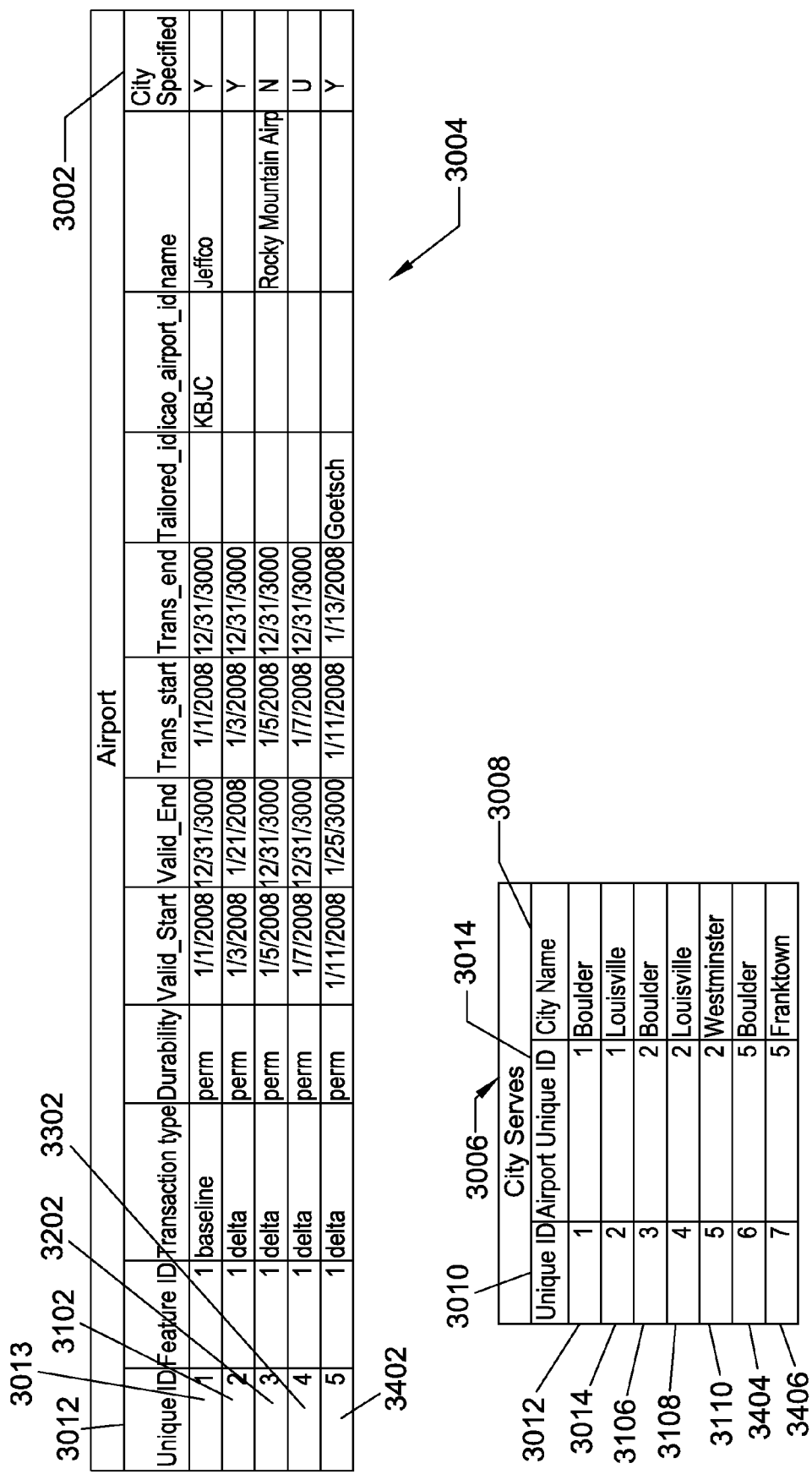
FIG. 36 illustrates a baseline-delta database module implementation of the complex object relationship scenario of FIG. 31 for transactions up to transaction P5.

Referring now to FIG. 36, the P5 Transaction 2910 set the city served list to Boulder and Franktown for the tailored customer Goetsch. The tailored_id is set for the delta row 3402. Two new rows 3404 and 3406, each with airport unique ID 3014 of 5 (to match the unique ID 3012 of delta row 3402 of airport table 3004). When a query is performed on 1/11/2008 with the tailoring of Goetsch, airport rows 3013, 3102, 3202, 3302, and 3402 with Unique IDs of 1, 2, 3, 4, and 5 respectively are retrieved, and the state of the feature is computed. Delta row 3402 with Unique ID 5 is used for the City Specified field 3002, which has a value of "Y," indicating that there are rows in the City Serves table 3006 for this delta row. The City Serves table 3006 is then queried for rows having an Airport Unique ID of 5. The query returns rows 3404 and 3406 with Unique IDs of 6 and 7 respectively, giving Boulder and Franktown for the tailored query.

A standard query with no tailoring on 1/11/2008 would retrieve the airport rows with Unique IDs of 1, 2, 3, and 4, specifically rows 3013, 3102, 3202, and 3302. Row 3402 with Unique ID 5 would be excluded because it is tailored. Row 3302 with Unique ID of 4 is the most effective setting for the City Specified attribute, which is set to "U," indicating that the attribute is unset and therefore there are no cities specified for the airport in the City Serves table 3006.

Figure 37:
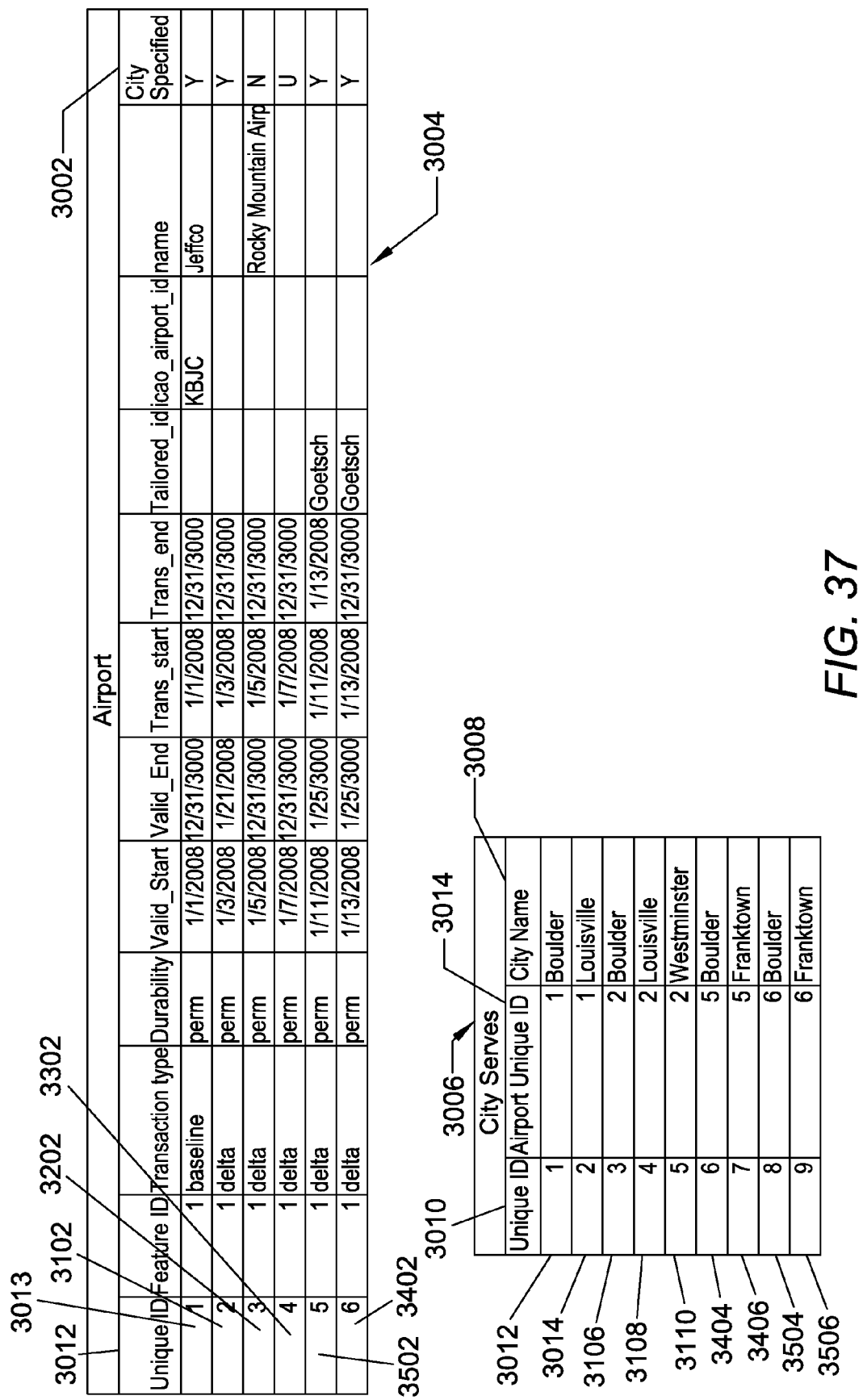
FIG. 37 illustrates a baseline-delta database module implementation of the complex object relationship scenario of FIG. 31 for transactions up to transaction P6.

Referring to FIG. 37, the P6 transaction 2912 is a correction on the start date of the P5 transaction 2910. The correction is handled in the same as any other correction, except that the City Serves rows are written again as row 3504 and row 3506 pointing to the corrected airport row 3502 because a new row with a new Unique ID 3012 being written for the corrected airport row 3502. Correction row 3502 updates the transaction end date on the airport 3402 row with Unique ID 5, setting it to the transaction start date of the correction. Next, the correction row 3502 is written with the Unique ID 6 and the new valid start date of 1/13/2008. The City Specified attribute 3002 is set to "Y." Boulder and Franktown are added to the City Serves table 3006 by adding rows 3504 and 3506 with the Airport Unique ID attribute set to 6, the Unique ID of airport correction row 3502.

Many navigational features have defined associations to other navigational features. The cardinality of these relationships may be one-to-one, one-to-many, many-to-one, or many-to-many. Examples of one-to-one and one-to-many relationships have been presented above. FIG. 38 illustrates an example scenario in which airports share a many-to-many relationship with NavAids. Associations are created between the features as well as removed and features themselves are added and removed to accommodate real world situations.

In this example scenario, the P1 transaction 3602 creates a new airport NCOS with a valid start date of 1/1/2008. The P2 transaction 3604 creates an additional airport KLIM also with a valid start of 1/1/2008. The P3 transaction 3606 makes an elevation change to KCOS on 1/3/2008. Also on 1/3/2008, the P4 transaction 3608 creates a NavAid (KDEL) and associates it with KLIM and KCOS. The P5 transaction 3610 makes a correction to the start date of the P4 transaction 3608 by setting the start date to 1/5/2008. The P6 transaction 3612 adds another NavAid (KPIG) and associates it with KCOS on 1/7/2008. The P7 transaction 3614 changes NavAid KPIG to associate it with KLIM on 1/9/2008. The P8 transaction 3616 tailors NavAid KDEL to associate it with KCOS for customer Goetsch on 1/7/2008. The P9 transaction 3618 deletes NavAid KPIG on 1/11/2008. The P10 ransaction 3620 undeletes NavAid KPIG on 1/13/2008. Finally, the P11 transaction 3622 deletes airport KCOS, also on 1/13/2008.

Figure 41:
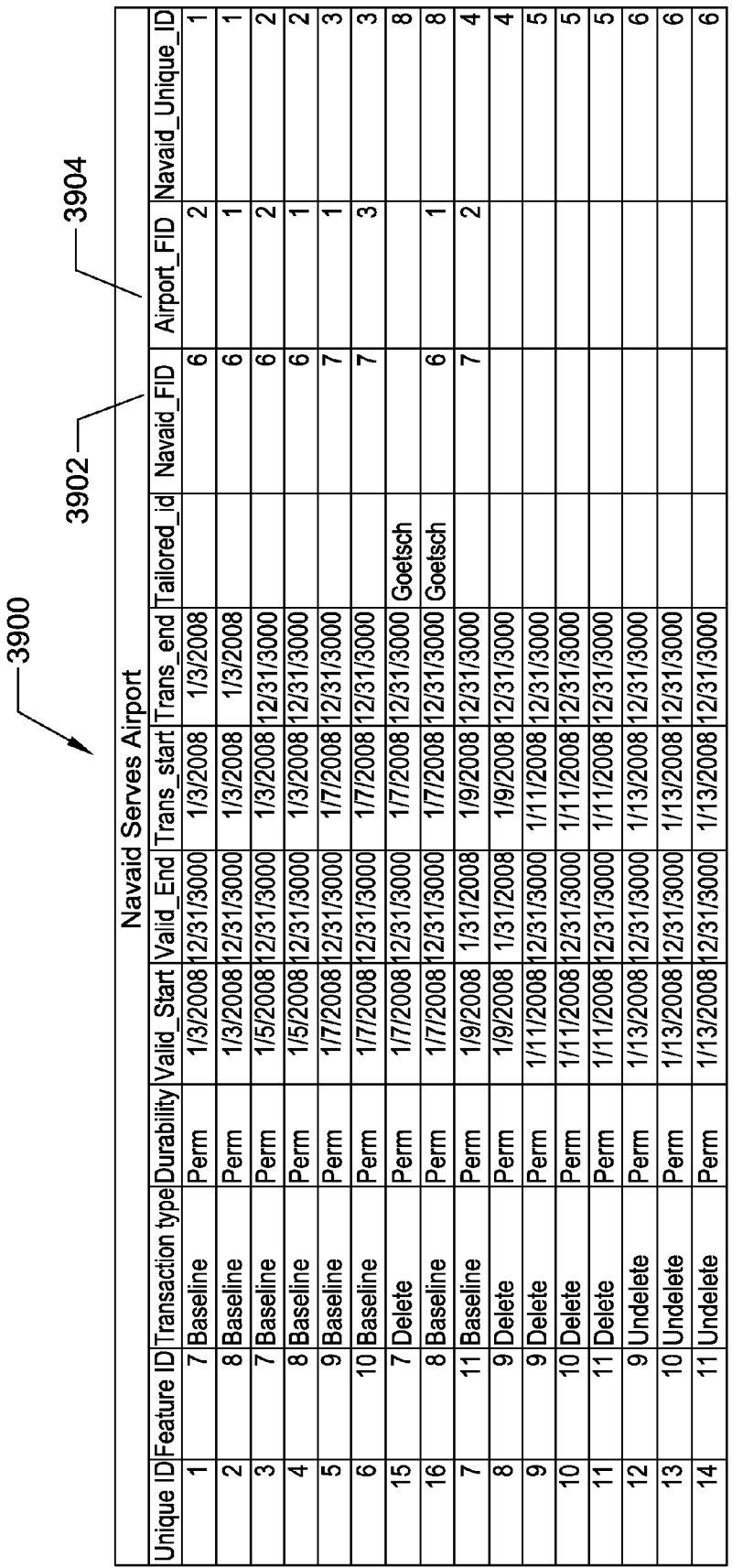
FIG. 41 illustrates a baseline-delta database module implementation of a NavAid serves Airport association table.

In some configurations of the present disclosure and referring to FIG. 39, FIG. 40, and FIG. 41, three tables 3700, 3800, and 3900 can be used to support this scenario. An airport table 3700 shown in FIG. 39 and a NavAid table 3800 shown in FIG. 40 are used to store their respective data. A third association table, in this example, the NavAid serves airport table 3900 shown in FIG. 41, is also used to manage the relationship between the two features. (Note: unlike previous example scenarios, the rows of example tables 3700, 3800, and 3900 do not necessarily match the rows that would be generated by the scenario of FIG. 38.)

While it is not conventional to consider associations as features, per se, each individual association does exhibit all of the same properties of a modeled feature with respect to effectivity. The NavAid serves airport table 3900 contains the information to maintain the relationship between NavAids and airports. Each row 3802, 3804, 3806, 3808, 3810, 3812, 3814, and 3816 describes a single NavAid to Airport association. The feature id 3720 is unique per NavAid_FID/Airport_FID 3704/3818 combination. The effectivity parameters allow bitemporal and multidimensional constraints on relationships. For example, a relationship can be created for a specific customer, i.e., a tailored association such as that shown in row 3810. For correction scenarios to reverse or correct associations based upon corrections from source data, the Navaid_Unique_ID 3818 maintains the unique id 3704 of the master record from the base table 3700 that created the record in the association table. The NavAid_FID field 3902 and Airport_FID field 3904 in the NavAid serves airport table 3900 fields define the relationship between a NavAid 3820 and an FID. As the relationship between a NavAid and its airports is updated, the Navaid serves airport table 3900 is updated to reflect the new state of the relationship. Also, as Navaids and/or Airports are removed, the associated relationship records in Navaid Serves Airport are also removed.

In some configurations of the present disclosure, a database maintainer may frequently make changes, corrections, or additions to the base feature data to support the needs of a particular product or type of product. These changes are not intended for the general use by all products, so the modifications must be appropriately marked so that they can be included in those products that require them and excluded from those products that do not. These extensions are included in the multidimensional effectivity space by steps that include the addition of another axis to represent the extensions. This method is completely consistent with the effectivity model described herein.

Also, a database maintainer may have many products with varying extract needs. In essence, each product provides a different view of the same data, defined by the intended usage or other characteristics of the product. For example, charting products provide a static, fixed duration view of the navigational data that requires only permanent data that is valid at a given point in time or over a specified range in time. NOTAM products are more dynamic in nature and are valid for a very short period of time, and therefore may only require temporary data. Other products may require a combination of permanent and temporary data, and may be cycle driven.

An example of a product that may require a combination of permanent and temporary data might have the following specifications:

Cycles are 28 days;

For a permanent or temporary change to be included, it must start within or before the first week of the cycle; and For a permanent change or a temporary change to be included, the change must be effective for at least three weeks of the cycle.

Figure 42:
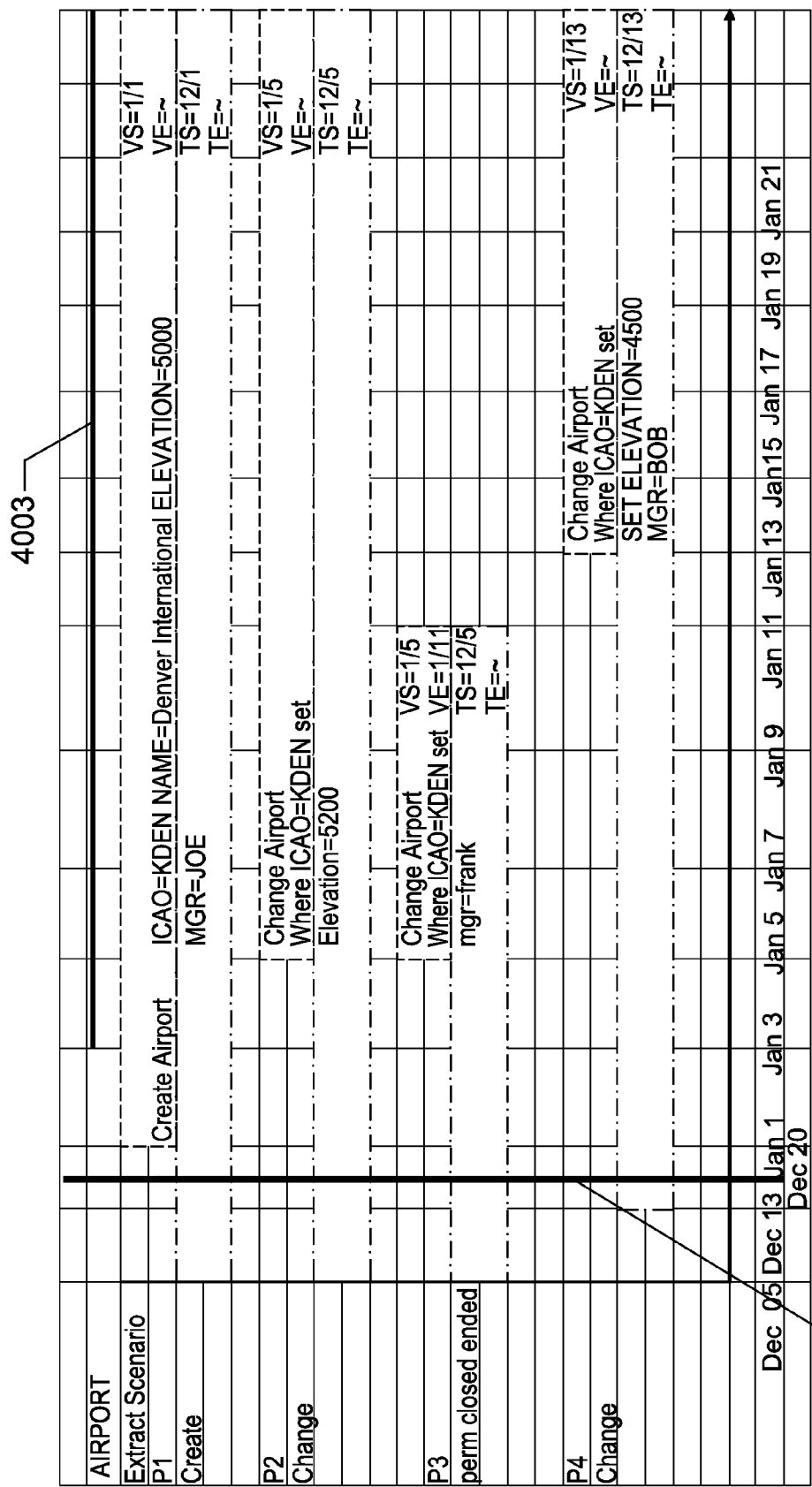
FIG. 42 is an illustration of an example extract scenario.

FIG. 42 shows an example that highlights extraction requirements that meet the above specifications. Bar 4001 shows the date the extract is taken on 12/20/2007. Bar 4003 shows the dates the cycle is effective, from 1/3/2008 to 1/31/2008. The scenario shows a series of future effective transactions on the airport KDEN. The P1 transaction 4002 creates the airport. The P2 transaction 4004 changes the airport elevation to 5200 and is effective until further notice. The P3 transaction 4006 is a closed ended permanent change that sets the airport manager name to Frank. The P3 transaction 4006 is valid from 1/5/2008 to 1/11/2008. The P4 transaction 4008 changes the elevation of the airport to 4500 and the manager name to Bob. Following the extract rules above, the P1 transaction 4002 and the transaction 4004 are the only transactions that are included in the extract. The P3 transaction 4006 is not valid for at least three weeks of the cycle. The P4 transaction 4008 does not start within the first week of the cycle, and is not valid for three weeks of the cycle.

The data stored using a baseline-delta configuration of the present disclosure is shown in FIG. 43. Following the extract rules above, rows 4102 and 4104, with Unique IDs 1 and 2 respectively, are returned and then composed into a feature, thereby returning the expected results for this extract scenario.

Figure 44:
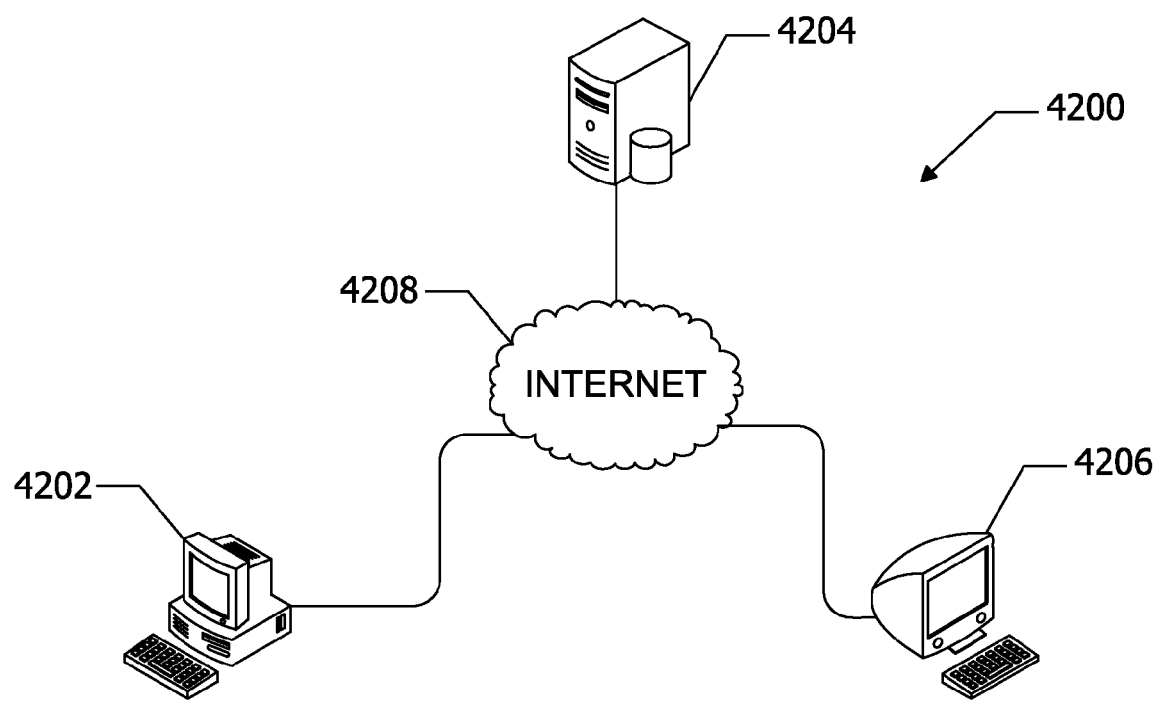
FIG. 44 is a pictorial block diagram of an apparatus configuration of the present disclosure.

To summarize, and referring to FIG. 44, some configurations of the present disclosure provide an apparatus 4200 that includes a computer-implemented database controller module 4202, a computer-implemented database module 4204, and a computer-implemented database query module 4206. Modules 4202, 4204, and 4206 may reside as software or firmware modules running in a single database server and using the memory and processor(s) of the server, although it is not required that all of these modules run in a single computer or server as long as they are in functional communication with one another. There may be a plurality of instances of any of these modules present. For example, a plurality of database controller modules 4202 may be present to allow a plurality of analysts or data entry technicians to enter data into database module 4204. There may also be a plurality of instances of query modules 4206 present to allow a plurality of customers and/or users to access database module 4204 with queries. Furthermore, there may be a plurality of database modules 4204 present to serve as hot and/or cold backups of one another. There may also be other modules present, such as database maintenance and back-up modules, but these are well-known to those of ordinary skill in the art and are not a necessary part of the presently described embodiments. In particular, controller module 4202 and/or query module 4206 may be part of another computer or computers connected to a suitable network to database module 4204. For example, and as shown in FIG. 44, controller module 4202 and query module 4206 can reside in separate remote computers connected to database module 4204 via the Internet 4208 or any other suitable public or private, wired or wireless network. Another configuration example has query modules 4206 residing in the same computer as database module 4204 and activated by a remote terminal or computer at a computer indicated by the location marked as 4206 in FIG. 44.

The software and/or firmware comprising computer-implemented database controller module 4202 is configured to enter baseline data into the computer-implemented database module 4204 and to enter changes into the computer-implemented database module 4202 using both an extensible multidimensional effectivity method and a baseline-delta method of recording only an indicated change with its effectivity parameters.

The computer-implemented database query module 4206 is configured to retrieve answers to queries relating to the baseline data and the changes and to return the answers in response to the queries.

In some configurations of the present disclosure, the computer-implemented database module 4204 is configured to contain aeronautical data. Also, in some configurations of the present disclosure, the computer-implemented database controller module 4202 is configured to enter tailored data for a customer into the computer implemented database module 4204, and the computer implemented database query module 4206 is configured to query the computer-implemented database module 4204 to conditionally deliver the tailored data depending upon the customer making a query. The computer-implemented database controller 4202 is also configured to untailor the tailored data in some configurations.

Also, in some configurations, the computer-implemented database controller module 4202 is configured to enter transactions with a transaction type indicating "delete" or "undelete." The transactions indicating "delete" or "undelete" can be tailored transactions, in which configurations the computer-implemented database query module 4206 is configured to deliver tailored responses to queries depending upon the customer making a query.

In some configurations of the present disclosure, computer-implemented database controller module 4202 is configured to store attributes of a feature wherein the attributes comprise a list of values or a list of complex objects, and the storing of attributes of a feature comprises including a "specified" column indicating the storage of an attribute list in a related table, and creating the related table including a column for items in the attribute list. In some of these configurations, the database controller module 4202 is further configured to remove associations between features in the computer-implemented database module 4204, to create and remove associations between features, and to create and remove many-to-many associations between features. In some of these configurations, the computer-implemented database module 4204 comprises navigational information and/or aeronautical information.

Figure 45:
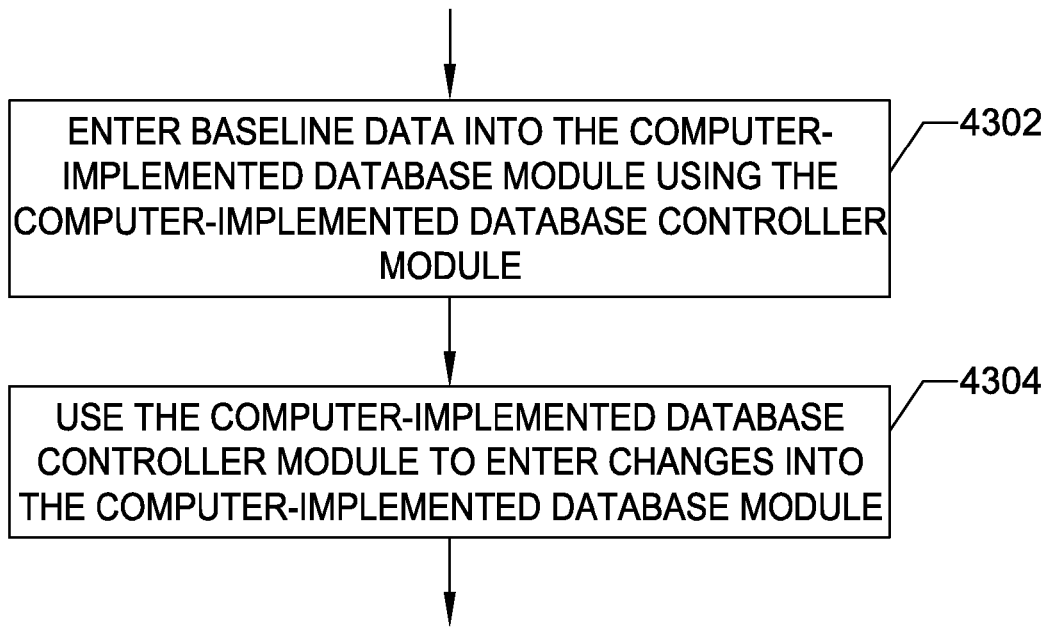
FIG. 45 is a flow chart of a method configuration of the present disclosure.
Figure 46:
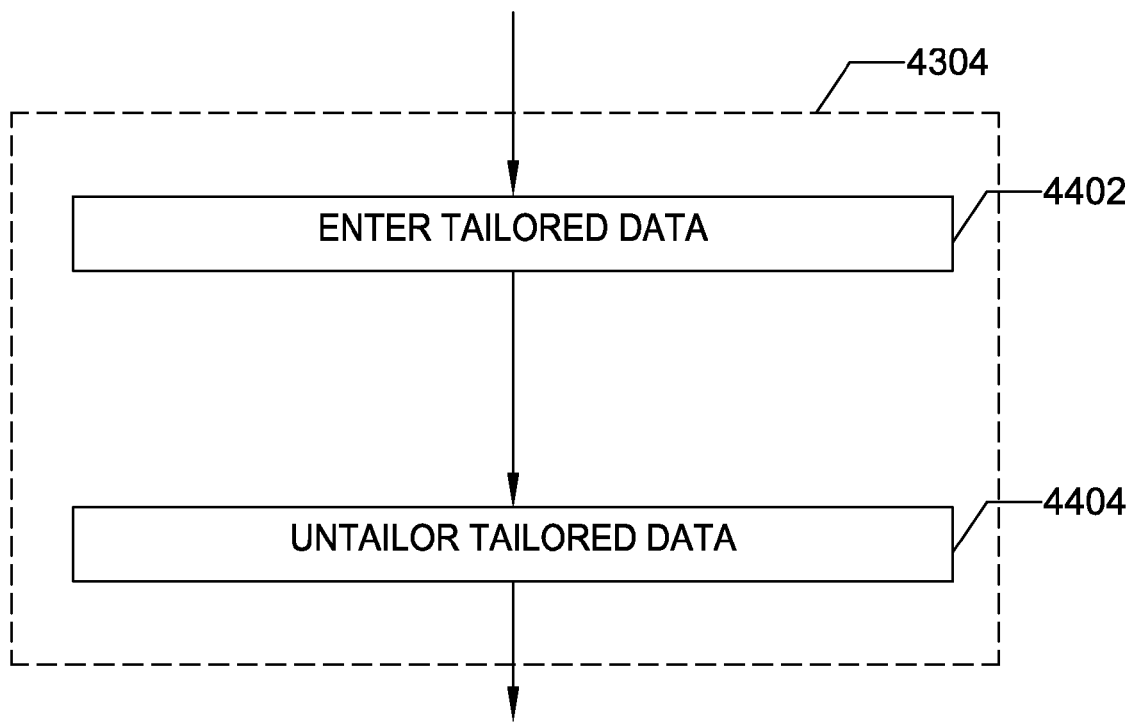
FIG. 46 is a flow chart showing a part of the method of FIG. 45 in more detail, representing certain more specific method configurations of the present disclosure.

Some configurations of the present disclosure provide a method for utilizing a computer-implemented database controller module 4202 and a computer-implemented database module 4204. Referring now to FIG. 45, the method includes, at block 4302, entering baseline data into the computer-implemented database module using the computer-implemented database controller module. The method further includes, at block 4304, using the computer-implemented database controller module to enter changes into the computer-implemented database module, wherein at least one or more changes to the computer-implemented database module are made by the computer-implemented database controller module using both an extensible multidimensional effectivity method and a baseline-delta method of recording only an indicated change with its effectivity parameters. In some of these configurations, computer-implemented database module 4204 contains aeronautical data. Also, in some of these configurations and referring to FIG. 46, the one or more changes to the computer-implemented database module 4204 include entering tailored data at 4402 and/or untailoring the tailored data at 4404.

In some configurations of the present disclosure, the one or more changes to the computer-implemented database module 4204 comprise entering transactions with transaction type indicating "delete" or "undelete." The transactions indicating "delete" or "undelete" can be tailored transactions.

In some configurations of the present disclosure, the one or more changes to the computer-implemented database module 4204 include storing attributes of a feature that comprise a list of values or a list of complex objects. The storing of attributes of a feature includes entering a "specified" column indicating the storage of an attribute list in a related table, and creating the related table including a column for items in the attribute list. In some of these configurations, the one or more changes to the computer-implemented database module 4204 include creating and removing associations between features, creating and removing associations between features, and creating and removing many-to-many associations between features. In some of these configurations, the computer-implemented database module 4204 includes a navigational database and/or an aeronautical database.

Note that some configurations of the baseline-delta method allow storing the data and/or performing data maintenance in a manner completely detached from and unaware of any product-specific extract needs. The data, as represented, is equally suitable for electronic data, including 424 aviation navigation data extracts, charting extracts, NOTAM extracts, and others.

It will thus be seen that combining an extensible multidimensional effectivity method with a baseline-delta method achieves a number of advantages. The extensible multidimensional effectivity methods provide configurations of the present disclosure with flexibility in determining which data are applicable and available. When data is viewed or extracted, the effectivity characteristics that are appropriate for a selected particular usage of the data are specified as criteria, allowing the configuration to retrieve and combine only those baseline records and/or delta records that meet the specified criteria into a composite representation of the feature. By contrast, prior art versioned feature methods that precompose composite representations of the features (during data ingest/data maintenance operations) must correctly anticipate any and all representations of features that are requested. By having to anticipate representations of features that are (or may be) requested, these prior art methods unnecessarily and undesirably couple maintenance of the feature data with the usage of the data.

Configurations of the present disclosure using baseline-delta methods ease data maintenance and can ease storage requirements because all of the anticipated representations of the features do not have to be completely replicated and stored. Instead, baseline-delta method configurations only store changes to attributes. For example, in at least one prior art versioned feature configuration, if a change arrives that is applicable in multiple dimensions, for example, valid time and customer tailoring, a fully populated record would have to be created with only the tailoring and valid time being modified. The prior art versioned database would now have the original record with all the fields populated and an exact copy of the record with only the valid time and tailored information changed. However, in baseline-delta method configurations, only the indicated change or changes with its/their effectivity parameter(s) is/are recorded. Therefore, configurations of the present disclosure save storage space when compared to prior art configurations that use fully populated records to store changes.

Although described herein in conjunction with an aviation database, the methods and apparatus described herein are not limited to such databases. For example, upon gaining an understanding of the methods and apparatus described in the present disclosure, the modification of these methods and apparatus to other transportation scenarios (e.g., busses, trains, etc.) as well as other types of databases not relating to transportation will be within the ability of one of ordinary skill in the art.

It will be understood that the word "may," when used to describe a configuration in this disclosure, is used in the permissive sense rather than the indeterminate sense.

This written description uses examples to disclose various embodiments, including the best mode, and also to enable any person skilled in the art to make and use any devices or systems and perform any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for utilizing a computer-implemented database controller module and a computer-implemented database module, said method comprising:
    entering, by a processor, baseline data for a NavAid model that includes one or more features into the computer-implemented database module using the computer-implemented database controller module, wherein the computer-implemented database module contains one or more of the following: aeronautical data, marine data, and rail data; and
    using, by the processor, the computer-implemented database controller module to enter changes to the baseline data into the computer-implemented database module, wherein at least one or more changes to the baseline data are made by the computer-implemented database controller module by recording only a change with parameters of the baseline data that are affected by the entered changes;
    receiving a query related to the baseline data and at least one of the changes to the baseline data;
    using the NavAid model to correlate the baseline data and the changes to the baseline data;
    presenting a result of the query by creating a NavAid associated with the one or more changes and the baseline data.

2. A method in accordance with claim 1 wherein said at least one or more changes to the baseline data include updating the baseline data with tailored data.

3. A method in accordance with claim 2 wherein said at least one or more changes to the baseline data include untailoring the tailored data.

4. A method in accordance with claim 1 wherein said at least one or more changes to the baseline data comprise entering transaction data with a transaction type indicating "delete" or "undelete."

5. A method in accordance with claim 4 wherein said transactions indicating "delete" or "undelete" are tailored transactions.

6. A method in accordance with claim 1 wherein said one or more changes to the baseline data comprise storing attributes of a feature that includes a list of values or a list of complex objects, and wherein said storing attributes of a feature comprises including a "specified" column indicating the storage of an attribute list in a related table, and creating the related table including a column for items in the attribute list.

7. A method in accordance with claim 6 wherein said one or more changes to the baseline data include creating and removing associations between features in the baseline data, and creating and removing many-to-many associations between features in the baseline data.

8. A method in accordance with claim 7 wherein the computer-implemented database module includes at least one of an aeronautical database and a navigational database.

9. A method in accordance with claim 1 wherein at least one or more changes to the baseline data are made by the computer-implemented database controller module.

10. A method in accordance with claim 1 wherein the baseline data associated with the one or more features has not been altered with tailored data.

11. An apparatus comprising:
a computer-implemented database controller;
a NavAid;
a computer-implemented database module that includes one or more of the following: aeronautical data, marine data, and rail data; and
a computer-implemented database query module;
wherein the computer-implemented database controller module is configured to enter, using a processor, baseline data into the computer-implemented database module and to enter changes to the baseline data, and wherein at least one or more of the changes to the baseline data are made by the computer-implemented database controller module by recording only a change with parameters of the baseline data that are affected by the entered changes;
wherein the NavAid is configured to correlate the baseline data and the changes to the baseline data; and
wherein said computer-implemented database query module is configured to retrieve, using the processor, answers to queries relating to the baseline data and the changes to present to a user.

12. An apparatus in accordance with claim 11 wherein the computer-implemented database controller module is configured to enter tailored data associated with the baseline data for a customer into the computer implemented database module, and the computer implemented database query module is configured to query the computer-implemented database module to conditionally deliver the tailored data depending upon the customer making a query.

13. An apparatus in accordance with claim 12 wherein the computer-implemented database controller is configured to untailor the tailored data.

14. An apparatus in accordance with claim 11 wherein the computer-implemented database controller module is configured to enter transactions associated with the baseline data with a transaction type indicating "delete" or "undelete."

15. An apparatus in accordance with claim 14 wherein said transactions indicating "delete" or "undelete" are tailored transactions, and the computer-implemented database query module is configured to deliver tailored responses to queries depending upon the customer making a query.

16. An apparatus in accordance with claim 11 wherein the computer-implemented database controller module is configured to store attributes of a feature within the baseline data, wherein the attributes comprise a list of values or a list of complex objects, and said storing attributes of a feature comprises including a "specified" column indicating the storage of an attribute list in a related table, and creating the related table including a column for items in the attribute list.

17. An apparatus in accordance with claim 16 wherein the computer-implemented database controller module is further configured to remove associations between features of the baseline data to create and remove associations between features of the baseline data, and to create and remove many-to-many associations between features of the baseline data.

\* \* \* \* \*